United States Patent
Wang et al.

(10) Patent No.: US 10,200,193 B2
(45) Date of Patent: Feb. 5, 2019

(54) SHIFT REGISTER CAPABLE OF DEFENDING AGAINST DPA ATTACK

(71) Applicant: Ningbo University, Zhejiang (CN)

(72) Inventors: Pengjun Wang, Zhejiang (CN); Haoyu Qian, Zhejiang (CN); Huihong Zhang, Zhejiang (CN); Gang Li, Zhejiang (CN)

(73) Assignee: Ningbo University, Zhejiang (CN)

( * ) Notice: Subject to any disclaimer, the term of this patent is extended or adjusted under 35 U.S.C. 154(b) by 18 days.

(21) Appl. No.: 15/687,546

(22) Filed: Aug. 28, 2017

(65) Prior Publication Data

US 2018/0109371 A1    Apr. 19, 2018

(30) Foreign Application Priority Data

Oct. 13, 2016    (CN) .......................... 2016 1 0892330

(51) Int. Cl.
| | |
|---|---|
| H04L 29/06 | (2006.01) |
| H04L 9/00 | (2006.01) |
| G11C 19/00 | (2006.01) |
| H03K 3/3562 | (2006.01) |
| G11C 7/24 | (2006.01) |
| G11C 19/28 | (2006.01) |

(52) U.S. Cl.
CPC ................ *H04L 9/003* (2013.01); *G11C 7/24* (2013.01); *G11C 19/00* (2013.01); *G11C 19/28* (2013.01); *H03K 3/35625* (2013.01); *H04L 2209/12* (2013.01)

(58) Field of Classification Search
CPC ....... H04L 9/003; H04L 2209/12; G11C 7/24; G11C 19/00; G11C 19/28; H03K 3/35625
See application file for complete search history.

(56) References Cited

U.S. PATENT DOCUMENTS

| | | | |
|---|---|---|---|
| 7,159,245 B1* | 1/2007 | Muller | G06K 19/07363 380/265 |
| 2006/0126828 A1* | 6/2006 | Yoon | G06F 7/726 380/28 |
| 2009/0327382 A1* | 12/2009 | Hisakado | G06F 7/582 708/252 |

(Continued)

OTHER PUBLICATIONS

Noor Muhammed Nayeem, Lafifa Jamal and Hafiz Md. Hasan Babu, Efficient Reversible Montgomery Multiplier and Its Application to Hardware Cryptography, 2009, Journal of Computer Science 5 (1): 49-56, 2009, ISSN 1549-3636 © 2009 Science Publications.*

(Continued)

*Primary Examiner* — Ghodrat Jamshidi
(74) *Attorney, Agent, or Firm* — JCIPRNET

(57) ABSTRACT

The present invention discloses a shift register capable of defending against DPA attack, comprising 4 master-slave D flip-flops, 12 two-input NAND/AND gates, 4 three-input NOR/OR gates and 40 inverters; the 4 master-slave D flip-flops are provided with reset function; it is based on TSMC 65 mm CMOS technique; as indicated by Spectre simulation verification, the shift register of the present invention has correct logic function with NED and NSD below 2.66% and 0.63% respectively under multi PVT combinations, which is provided with significant performance in defense differential power consumption analysis.

4 Claims, 9 Drawing Sheets

(56) References Cited

U.S. PATENT DOCUMENTS

| | | | | |
|---|---|---|---|---|
| 2011/0302426 A1* | 12/2011 | Boehl | .................... | H04L 9/003 |
| | | | | 713/189 |
| 2012/0173878 A1* | 7/2012 | Boehl | .................... | H04L 9/003 |
| | | | | 713/176 |
| 2013/0191652 A1* | 7/2013 | Seok | .................... | G06F 21/755 |
| | | | | 713/300 |
| 2013/0326232 A1* | 12/2013 | Lewis | ................... | G06F 21/602 |
| | | | | 713/189 |
| 2014/0219444 A1* | 8/2014 | Boehl | .................... | H04L 9/003 |
| | | | | 380/46 |
| 2014/0237284 A1* | 8/2014 | Fine | ........................ | G06F 21/00 |
| | | | | 713/340 |
| 2015/0032787 A1* | 1/2015 | Gammel | ................. | G06F 7/582 |
| | | | | 708/252 |
| 2015/0074159 A1* | 3/2015 | Poschmann | .............. | G09C 1/00 |
| | | | | 708/270 |

OTHER PUBLICATIONS

Shi Yan, "Digital Electronic Technology [M], Edition 5," Higher Education Press, Beijing, 2006.

Yu et al., "Research on Logic Circuit Against Power Attack," Microelectronics, Aug. 2015, pp. 497-501.

Liu et al., "A Compound Register System against Power Analysis Attack," Journal of Cryptologic Research, Oct. 2014, pp. 411-421.

* cited by examiner

SHIFT REGISTER CAPABLE OF DEFENDING AGAINST DPA ATTACK

CROSS-REFERENCE TO RELATED APPLICATION

This application claims the priority benefit of China application no. 201610892330.5, filed on Oct. 13, 2016. The entirety of the above-mentioned patent application is hereby incorporated by reference herein and made a part of this specification.

FIELD OF THE INVENTION

The present invention is related to a shift register, in particular to a shift register capable of defending against Differential Power Analysis (DPA) attack.

BACKGROUND ART

Accompanied by IT security technologies, portable devices using crypto chip as the major component have witnessed an extensive application. However, crypto chip may disclose varied physical information associated with the data to be processed in case of encryption algorithm, such as energy consumption, electromagnetic radiation and runtime. Such physical information might be used by attackers for Side Channel Attack (SCA) on the crypto chip to snatch the password. Differential Power Analysis (DPA) is a simple and efficient SCA attack approach, which can significantly reduce the validity of the crypto chip. In recent years, scholars have put forward numerous technologies on defending against DPA attack, such as Dual-voltage Single-rail Dynamic Logic (DSDL), Masked Dual-Rial Pre-charge Logic (MDPL) and Sense Amplifier Based Logic (SABL). DSDL evaluation speed is slow due to the lack of corresponding pull-down network; As pointed out in the literature: "Yu Jingchao, Yan Yingjian, Wu Xuetao and etc. Study of Anti-Power-Attack Logic Circuit [J]. Microelectronics, 2015(4):497-501.", MDPL will have a poor performance in defending against DPA attack in case of postponement deviation to input signals. SABL has gradually become a common approach for defending against DPA attack owing to such features as high working speed and excellent performance in defending against DPA attack.

The shift register is a part used to execute logic operation or store information, which is widely applied to the digital encryption system. As indicated by studies, shift register is one of parts with high energy consumption in the encryption system; meanwhile, as it aims to process data when the clock edge is approaching, its working sequence variation is relatively fixed and easy for identification as compared with other parts; therefore, its energy consumption is normally taken as the analysis point for deciphering conventional crypto chip during differential power analysis.

On this account, it is of vital importance to design a shift register with excellent constant power consumption to defend against DPA attack based on proper logic function.

SUMMARY OF THE INVENTION

The technical issue to be settled by the present invention is to provide a shift register with excellent constant power consumption to defend against DPA attack based on proper logic function.

Technical solution used by the present invention to settle aforesaid technical issue is stated as follows: A shift register capable of defending against DPA attack, comprising the $1^{st}$ master-slave D flip-flop, the $2^{nd}$ master-slave D flip-flop, the $3^{rd}$ master-slave D flip-flop and the $4^{th}$ master-slave D flip-flop, the $1^{st}$ two-input NAND/AND gate, the $2^{nd}$ two-input NAND/AND gate, the $3^{rd}$ two-input NAND/AND gate, the $4^{th}$ two-input NAND/AND gate, the $5^{th}$ two-input NAND/AND gate, the $6^{th}$ two-input NAND/AND gate, the $7^{th}$ two-input NAND/AND gate, the $8^{th}$ two-input NAND/AND gate, the $9^{th}$ two-input NAND/AND gate, the $10^{th}$ two-input NAND/AND gate, the $11^{th}$ two-input NAND/AND gate and the $12^{th}$ two-input NAND/AND gate, the $1^{st}$ three-input NOR/OR gate, the $2^{nd}$ three-input NOR/OR gate, the $3^{rd}$ three-input NOR/OR gate and the $4^{th}$ three-input NOR/OR gate, the $1^{st}$ inverter, the $2^{nd}$ inverter, the $3^{rd}$ inverter, the $4^{th}$ inverter, the $5^{th}$ inverter, the $6^{th}$ inverter, the $7^{th}$ inverter, the $8^{th}$ inverter, the $9^{th}$ inverter, the $10^{th}$ inverter, the $11^{th}$ inverter, the $12^{th}$ inverter, the $13^{th}$ inverter, the $14^{th}$ inverter, the $15^{th}$ inverter, the $16^{th}$ inverter, the $17^{th}$ inverter, the $18^{th}$ inverter, the $19^{th}$ inverter, the $20^{th}$ inverter, the $21^{st}$ inverter, the $22^{nd}$ inverter, the $23^{rd}$ inverter, the $24^{th}$ inverter, the $25^{th}$ inverter, the $26^{th}$ inverter, the $27^{th}$ inverter, the $28^{th}$ inverter, the $29^{th}$ inverter, the $30^{th}$ inverter, the $31^{st}$ inverter, the $32^{nd}$ inverter, the $33^{rd}$ inverter, the $34^{th}$ inverter, the $35^{th}$ inverter, the $36^{th}$ inverter, the $37^{th}$ inverter, the $38^{th}$ inverter, the $39^{th}$ inverter and the $40^{th}$ inverter, the $1^{st}$ master-slave D flip-flop, the $2^{nd}$ master-slave D flip-flop, the $3^{rd}$ master-slave D flip-flop and the $4^{th}$ master-slave D flip-flop are provided with a clock terminal, an input terminal, an inverting input terminal, an inverting output terminal, a reset terminal and an inverting reset terminal; the $1^{st}$ two-input NAND/AND gate, the $2^{nd}$ two-input NAND/AND gate, the $3^{rd}$ two-input NAND/AND gate, the $4^{th}$ two-input NAND/AND gate, the $5^{th}$ two-input NAND/AND gate, the $6^{th}$ two-input NAND/AND gate, the $7^{th}$ two-input NAND/AND gate, the $8^{th}$ two-input NAND/AND gate, the $9^{th}$ two-input NAND/AND gate, the $12^{th}$ two-input NAND/AND gate, the $11^{th}$ two-input NAND/AND gate and the $12^{th}$ two-input NAND/AND gate are provided with a clock terminal, the $1^{st}$ input terminal, the $1^{st}$ inverting input terminal, the $2^{nd}$ input terminal, the $2^{nd}$ inverting input terminal, a NAND logic output terminal and a AND logic output terminal; the $1^{st}$ three-input NOR/OR gate, the $2^{nd}$ three-input NOR/OR gate, the $3^{rd}$ three-input NOR/OR gate and the $4^{th}$ three-input NOR/OR gate are provided with a clock terminal, the $1^{st}$ input terminal, the $1^{st}$ inverting input terminal, the $2^{nd}$ input terminal, the $2^{nd}$ inverting input terminal, the $3^{rd}$ input terminal, the $3^{rd}$ inverting input terminal, a NOR logic output terminal and an OR logic output terminal; clock terminal of the $1^{st}$ two-input NAND/AND gate, clock terminal of the $2^{nd}$ two-input NAND/AND gate, clock terminal of the $3^{rd}$ two-input NAND/AND gate, clock terminal of the $4^{th}$ two-input NAND/AND gate, clock terminal of the $5^{th}$ two-input NAND/AND gate, clock terminal of the $6^{th}$ two-input NAND/AND gate, clock terminal of the $7^{th}$ two-input NAND/AND gate, clock terminal of the $8^{th}$ two-input NAND/AND gate, clock terminal of the $9^{th}$ two-input NAND/AND gate, clock terminal of the $10^{th}$ two-input NAND/AND gate, clock terminal of the $11^{th}$ two-input NAND/AND gate, clock terminal of the $12^{th}$ two-input NAND/AND gate, clock terminal of the $1^{st}$ three-input NOR/OR gate, clock terminal of the $2^{nd}$ three-input NOR/OR gate, clock terminal of the $3^{rd}$ three-input NOR/OR gate, clock terminal of the $4^{th}$ three-input NOR/OR gate, clock terminal of the $1^{st}$ master-slave D flip-flop, clock terminal of the $2^{nd}$ master-slave D flip-flop and clock terminal of the $3^{rd}$ master-slave D flip-flop are connected to clock terminal of the $4^{th}$ master-slave D flip-flop, and the connecting terminal is clock terminal of the said shift register, the $1^{st}$ input terminal of the $1^{st}$ two-input NAND/AND gate is the right shift signal input terminal of the said shift register for input of right shift input signal; the $1^{st}$ inverting input terminal of the $1^{st}$ two-input NAND/AND gate is the inverting right shift signal input terminal of the said shift register for input of inverting right shift input signal; the $2^{nd}$ input terminal of the $1^{st}$ two-input NAND/AND gate, the $2^{nd}$ input terminal of the $4^{th}$ two-input NAND/AND gate and the $2^{nd}$ input terminal of the $7^{th}$ two-input NAND/AND gate are connected to the $2^{nd}$ input terminal of the $10^{th}$ two-input NAND/AND gate, and the connecting terminal is the right shift enabling signal input terminal of the said shift register for input of right shift enabling signal; the $2^{nd}$ inverting input terminal of the $1^{st}$ two-input NAND/AND gate, the $2^{nd}$ inverting input terminal of the $4^{th}$ two-input NAND/AND gate and the $2^{nd}$ inverting input terminal of the $7^{th}$ two-input NAND/AND gate are connected to the $2^{nd}$ inverting input terminal of the $10^{th}$ two-input NAND/AND gate, and the connecting terminal is the inverting right shift enabling signal input terminal of the said shift register for input of inverting right shift enabling signal; the $1^{st}$ input terminal of the $2^{nd}$ two-input NAND/AND gate, the $1^{st}$ input terminal of the $5^{th}$ two-input NAND/AND gate and the $1^{st}$ input terminal of the $8^{th}$ two-input NAND/AND gate are connected to the $1^{st}$ input terminal of the $11^{th}$ two-input NAND/AND gate, and the connecting terminal of the parallel-in-out enabling signal input terminal of the said shift register; the $1^{st}$ inverting input terminal of the $2^{nd}$ two-input NAND/AND gate, the $1^{st}$ inverting input terminal of the $5^{th}$ two-input NAND/AND gate and the $1^{st}$ inverting input terminal of the $8^{th}$ two-input NAND/AND gate are connected to the $1^{st}$ inverting input terminal of the $11^{th}$ two-input NAND/AND gate, and the connecting terminal is the inverting parallel-in-out enabling signal input terminal of the said shift register for input of inverting parallel-in-out enabling signal; the $2^{nd}$ input terminal of the $2^{nd}$ two-input NAND/AND gate is the $1^{st}$ input terminal of the said shift register for input of the $1^{st}$ bit signal of the 4-bit parallel input signal; the $2^{nd}$ inverting input terminal of the $2^{nd}$ two-input NAND/AND gate is the $1^{st}$ inverting input terminal of the said shift register for input of the $1^{st}$ bit signal of 4-bit inverting parallel input signal; the $2^{nd}$ input terminal of the $5^{th}$ two-input NAND/AND gate is the $2^{nd}$ input terminal of the said shift register for input of the $2^{nd}$ bit signal of 4-bit parallel input signal; the $2^{nd}$ inverting input terminal of the $5^{th}$ two-input NAND/AND gate is the $2^{nd}$ inverting input terminal of the said shift register for input of the $2^{nd}$ bit signal of 4-bit inverting parallel input signal; the $2^{nd}$ input terminal of the $8^{th}$ two-input NAND/AND gate is the $3^{rd}$ input terminal of the said shift register for input of the $3^{rd}$ bit signal of 4-bit parallel input signal; the $2^{nd}$ inverting input terminal of the $8^{th}$ two-input NAND/AND gate is the $3^{rd}$ inverting input terminal of the said shift register for input of the $3^{rd}$ bit signal of 4-bit inverting parallel input signal; the $2^{nd}$ input terminal of the $11^{th}$ two-input NAND/AND gate is the $4^{th}$ input terminal of the said shift register for input of the $4^{th}$ bit signal of 4-bit parallel input signal; the $2^{nd}$ inverting input terminal of the $11^{th}$ two-input NAND/AND gate is the $4^{th}$ inverting input terminal of the said shift register for input of the $4^{th}$ bit signal of 4-bit inverting parallel input signal; the $1^{st}$ input terminal of the $3^{rd}$ two-input NAND/AND gate, the $1^{st}$ input terminal of the $6^{th}$ two-input NAND/AND gate and the $1^{st}$ input terminal of the $9^{th}$ two-input NAND/AND gate are connected to the $1^{st}$ input terminal of the $12^{th}$ two-input NAND/AND gate, and the connecting terminal is the left shift enabling signal input terminal of the said shift register for input of left shift enabling signal; the $1^{st}$ inverting input signal of the $3^{rd}$ two-input NAND/AND gate, the $1^{st}$ inverting input signal of the $6^{th}$ two-input NAND/AND gate and the $1^{st}$ inverting input terminal of the $9^{th}$ two-input NAND/AND gate are connected to the $1^{st}$ inverting input terminal of the $12^{th}$ two-input NAND/AND gate, and the connecting terminal is the inverting left shift enabling signal input terminal of the said shift register for input of the inverting left shift enabling signal; the $2^{nd}$ input terminal of the $3^{rd}$ two-input NAND/AND gate and the $1^{st}$ input terminal of the $7^{th}$ two-input NAND/AND gate are connected to the output terminal of the $35^{th}$ inverter; the $2^{nd}$ inverting input terminal of the $3^{rd}$ two-input NAND/AND gate and the $1^{st}$ inverting input terminal of the $7^{th}$ two-input NAND/AND gate are connected to the output terminal of the $36^{th}$ inverter; the $1^{st}$ input terminal of the $4^{th}$ two-input NAND/AND gate is connected to the output terminal of the $33^{rd}$ inverter, the $1^{st}$ inverting input terminal of the $4^{th}$ two-input NAND/AND is connected to the output terminal of the $34^{th}$ inverter; the $2^{nd}$ input terminal of the $6^{th}$ two-input NAND/AND gate and the $1^{st}$ input terminal of the $10^{th}$ two-input NAND/AND gate are connected to the output terminal of the $37^{th}$ inverter; the $2^{nd}$ inverting input terminal of the $6^{th}$ two-input NAND/AND gate and the $1^{st}$ inverting input terminal of the $10^{th}$ two-input NAND/AND gate are connected to the output terminal of the $38^{th}$ inverter, the $2^{nd}$ input terminal of the $9^{th}$ two-input NAND/AND gate is connected to the output terminal of the $39^{th}$ inverter; the $2^{nd}$ inverting input terminal of the $9^{th}$ two-input NAND/AND gate is connected to the output terminal of the $40^{th}$ inverter; the $2^{nd}$ input terminal of the $12^{th}$ two-input NAND/AND gate is the left shift signal input terminal of the said shift register for input of left shift input signal; the $2^{nd}$ inverting input terminal of the $12^{th}$ two-input NAND/AND gate is the inverting left shift signal input terminal of the said shift register for input of inverting left shift input signal; the AND logic output terminal of the $1^{st}$ two-input NAND/AND gate is connected to input terminal of the $1^{st}$ inverter, output terminal of the $1^{st}$ inverter is connected to the $1^{st}$ inverting input terminal of the $1^{st}$ three-input NOR/OR gate; NAND logic output terminal of the $1^{st}$ two-input NAND/AND gate is connected to input terminal of the $2^{nd}$ inverter, output terminal of the $2^{nd}$ inverter is connected to the $1^{st}$ input terminal of the $1^{st}$ three-input NOR/OR gate; AND logic output terminal of the $2^{nd}$ two-input NAND/AND gate is connected to input terminal of the $3^{rd}$ inverter, output terminal of the $3^{rd}$ inverter is connected to the $2^{nd}$ inverting input terminal of the $1^{st}$ three-input NOR/OR gate; NAND logic output terminal of the $2^{nd}$ two-input NAND/AND gate is connected to input terminal of the $4^{th}$ inverter, output terminal of the $4^{th}$ inverter is connected to the $2^{nd}$ input terminal of the $1^{st}$ three-input NOR/OR gate; AND logic output terminal of the $3^{rd}$ two-input NAND/AND gate is connected to input terminal of the $5^{th}$ inverter, output terminal of the $5^{th}$ inverter is connected to the $3^{rd}$ inverting input terminal of the $1^{st}$ three-input NOR/OR gate; NAND logic output terminal of the $3^{rd}$ two-input NAND/AND gate is connected to input terminal of the $6^{th}$ inverter, output terminal of the $6^{th}$ inverter is connected to the $3^{rd}$ input terminal of the $1^{st}$ three-input NOR/OR gate; AND logic output terminal of the $4^{th}$ two-input NOR/OR gate is connected to input terminal of the $7^{th}$ inverter, output terminal of the $7^{th}$ inverter is connected to the $1^{st}$ inverting input terminal of the $2^{nd}$ three-input NAND/AND inverting input terminal; NAND logic output terminal of the $4^{th}$ two-input NAND/AND gate is connected to input terminal of the $8^{th}$ inverter, output terminal of the $8^{th}$ inverter is connected to the $1^{st}$ input terminal of the $2^{nd}$ three-input NOR/OR gate; AND logic output terminal of the 5$^{th}$ two-input NAND/AND gate is connected to input terminal of the 9$^{th}$ inverter, output terminal of the 9$^{th}$ inverter is connected to the 2$^{nd}$ inverting input terminal of the 2$^{nd}$ three-input NOR/OR gate; NAND logic output terminal of the 5$^{th}$ two-input NAND/AND gate is connected to input terminal of the 10$^{th}$ inverter, output terminal of the 10$^{th}$ inverter is connected to the 2$^{nd}$ input terminal of the 2$^{nd}$ three-input NOR/OR gate; AND logic output terminal of the 6$^{th}$ two-input NAND/AND gate is connected to input terminal of the 11$^{th}$ inverter; output terminal of the 11$^{th}$ inverter is connected to the 3$^{rd}$ inverting input terminal of the 2$^{nd}$ three-input NOR/OR gate; NAND logic output terminal of the 6$^{th}$ two-input NAND/AND gate is connected to input terminal of the 12$^{th}$ inverter; output terminal of the 12$^{th}$ inverter is connected to the 3$^{rd}$ input terminal of the 2$^{nd}$ three-input NAND/AND gate; AND logic output terminal of the 7$^{th}$ two-input NAND/AND gate is connected to input terminal of the 13$^{th}$ inverter; output terminal of the 13$^{th}$ inverter is connected to the 1$^{st}$ inverting input terminal of the 3$^{rd}$ three-input NOR/OR gate; NAND logic output terminal of the 7$^{th}$ two-input NAND/AND gate is connected to input terminal of the 14$^{th}$ inverter; output terminal of the 14$^{th}$ inverter is connected to the 1$^{st}$ input terminal of the 3$^{rd}$ three-input NOR/OR gate; AND logic output terminal of the 8$^{th}$ two-input NAND/AND gate is connected to input terminal of the 15$^{th}$ inverter, output terminal of the 15$^{th}$ inverter is connected to the 2$^{nd}$ inverting input terminal of the 3$^{rd}$ three-input NOR/OR gate; NAND logic output terminal of the 8$^{th}$ two-input NAND/AND gate is connected to input terminal of the 16$^{th}$ inverter; output terminal of the 16$^{th}$ inverter is connected to the 2$^{nd}$ input terminal of the 3$^{rd}$ three-input NAND/AND gate; AND logic output terminal of the 9$^{th}$ two-input NAND/AND gate is connected to input terminal of the 17$^{th}$ inverter; output terminal of the 17$^{th}$ inverter is connected to the 3$^{rd}$ inverting input terminal of the 3$^{rd}$ three-input NOR/OR gate; NAND logic output terminal of the 9$^{th}$ two-input NAND/AND gate is connected to input terminal of the 18$^{th}$ inverter, output terminal of the 18$^{th}$ inverter is connected to the 3$^{rd}$ input terminal of the 3$^{rd}$ three-input NOR/OR gate; AND logic output terminal of the 10$^{th}$ two-input NAND/AND gate is connected to input terminal of the 19$^{th}$ inverter, output terminal of the 19$^{th}$ inverter is connected to the 1$^{st}$ inverting input terminal of the 4$^{th}$ three-input NOR/OR gate; NAND logic output terminal of the 10$^{th}$ two-input NAND/AND gate is connected to input terminal of the 20$^{th}$ inverter; output terminal of the 20$^{th}$ inverter is connected to the 1$^{st}$ input terminal of the 4$^{th}$ three-input NOR/OR gate; AND logic output terminal of the 11$^{th}$ two-input NAND/AND gate is connected to input terminal of the 21$^{st}$ inverter; output terminal of the 21$^{st}$ inverter is connected to the 2$^{nd}$ inverting input terminal of the 4$^{th}$ three-input NOR/OR gate; NAND logic output terminal of the 11$^{th}$ two-input NAND/AND gate is connected to input terminal of the 22$^{nd}$ inverter; output terminal of the 22$^{nd}$ inverter is connected to the 2$^{nd}$ input terminal of the 4$^{th}$ three-input NAND/AND gate; AND logic output terminal of the 12$^{th}$ two-input NAND/AND gate is connected to input terminal of the 23$^{rd}$ inverter, output terminal of the 23$^{rd}$ inverter is connected to the 3$^{rd}$ inverting input terminal of the 4$^{th}$ three-input NAND/AND gate; NAND logic output terminal of the 12$^{th}$ two-input NAND/AND gate is connected to input terminal of the 24$^{th}$ inverter, output terminal of the 25$^{th}$ inverter is connected to inverting input terminal of the 1$^{st}$ master-slave D flip-flop; NOR logic output terminal of the 1$^{st}$ three-input NOR/OR gate is connected to input terminal of the 26$^{th}$ inverter, output terminal of the 26$^{th}$ inverter is connected to input terminal of the 1$^{st}$ master-slave D flip-flop; OR logic output terminal of the 2$^{nd}$ three-input NOR/OR gate is connected to input terminal of the 27$^{th}$ inverter, output terminal of the 27$^{th}$ inverter is connected to inverting input terminal of the 2$^{nd}$ master-slave D flip-flop; NOR logic output terminal of the 2$^{nd}$ three-input NOR/OR gate is connected to input terminal of the 28$^{th}$ inverter; output terminal of the 28$^{th}$ inverter is connected to input terminal of the 2$^{nd}$ master-slave D flip-flop; OR logic output terminal of the 3$^{rd}$ three-input NOR/OR gate is connected to input terminal of the 29$^{th}$ inverter, output terminal of the 29$^{th}$ inverter is connected to inverting input terminal of the 3$^{rd}$ master-slave D flip-flop; NOR logic output terminal of the 3$^{rd}$ three-input NOR/OR gate is connected to input terminal of the 30$^{th}$ inverter, output terminal of the 30$^{th}$ inverter is connected to input terminal of the 3$^{rd}$ master-slave D flip-flop; OR logic output terminal of the 4$^{th}$ three-input NOR/OR gate is connected to input terminal of the 31$^{st}$ inverter, output terminal of the 31$^{st}$ inverter is connected to inverting input terminal of the 4$^{th}$ master-slave D flip-flop; NOR logic output terminal of the 4$^{th}$ three-input NOR/OR gate is connected to the 32$^{nd}$ inverter, output terminal of the 32$^{nd}$ inverter is connected to input terminal of the 4$^{th}$ master-slave D flip-flop; reset terminal of the 1$^{st}$ master-slave D flip-flop, reset terminal of the 2$^{nd}$ master-slave D flip-flop and reset terminal of the 3$^{rd}$ master-slave D flip-flop are connected to reset terminal of the 4$^{th}$ master-slave D flip-flop, and the connecting terminal is reset terminal of the said shift register for input of reset signal; inverting reset terminal of the 1$^{st}$ master-slave D flip-flop, inverting reset terminal of the 2$^{nd}$ master-slave D flip-flop and inverting reset terminal of the 3$^{rd}$ master-slave D flip-flop are connected to inverting reset terminal of the 4$^{th}$ master-slave D flip-flop, and the connecting terminal is inverting reset terminal of the said shift register for input of inverting reset signal; input terminal of the 33$^{rd}$ inverter is connected to inverting output terminal of the 1$^{st}$ master-slave D flip-flop, and the connecting terminal is the 1$^{st}$ inverting output terminal of the said shift register for output of the 1$^{st}$ bit inverting output signal; input terminal of the 34$^{th}$ inverter is connected to output terminal of the 1$^{st}$ master-slave D flip-flop, and the connecting terminal is the 1$^{st}$ output terminal of the said shift register for output of the 1$^{st}$ bit output signal; input terminal of the 35$^{th}$ inverter is connected to inverting output terminal of the 2$^{nd}$ master-slave D flip-flop, and the connecting terminal is the 2$^{nd}$ inverting output terminal of the said shift register for output of the 2$^{nd}$ bit inverting output signal; input terminal of the 36$^{th}$ inverter is connected to output terminal of the 2$^{nd}$ master-slave D flip-flop, and the connecting terminal is the 2$^{nd}$ output terminal of the said shift register for output of the 2$^{nd}$ bit output signal; input terminal of the 37$^{th}$ inverter is connected to inverting output terminal of the 3$^{rd}$ master-slave D flip-flop, and the connecting terminal is the 3$^{rd}$ inverting output terminal of the said shift register for output of the 3$^{rd}$ bit inverting output signal; input terminal of the 38$^{th}$ inverter is connected to output terminal of the 3$^{rd}$ master-slave D flip-flop, and the connecting terminal is the 3$^{rd}$ output terminal of the said shift register for output of the 3$^{rd}$ bit output signal; input terminal of the 39$^{th}$ inverter is connected to inverting output terminal of the 4$^{th}$ master-slave D flip-flop, and the connecting terminal is the 4$^{th}$ inverting output terminal of the said shift register for output of the 4$^{th}$ bit inverting output signal; input terminal of the 40$^{th}$ inverter is connected to output terminal of the 4$^{th}$ master-slave D flip-flop, and the connecting terminal is the 4$^{th}$ output terminal of the said shift register for output of the 4$^{th}$ bit output signal.

The 1st two-input NAND/AND gate comprises the 1st MOS transistor, the 2nd MOS transistor, the 3rd MOS transistor, the 4th MOS transistor, the 5th MOS transistor, the 6th MOS transistor, the 7th MOS transistor, the 8th MOS transistor, the 9th MOS transistor, the 10th MOS transistor, the 11th MOS transistor and the 12th MOS transistor; the 1st MOS transistor, the 2nd MOS transistor, the 3rd MOS transistor and the 4th MOS transistor belong to PMOS transistors; the 5th MOS transistor, the 6th MOS transistor, the 7th MOS transistor, the 8th MOS transistor, the 9th MOS transistor, the 10th MOS transistor, the 11th MOS transistor and the 12th MOS transistor belong to NMOS transistors; source of the 1st MOS transistor, source of the 2nd MOS transistor, source of the 3rd MOS transistor and source of the 4th MOS transistor are connected to grid of the 7th MOS transistor, and the connecting terminal is connected to the power source; grid of the 1st MOS transistor and the 4th MOS transistor are connected to grid of the 12th MOS transistor, and the connecting terminal is clock terminal of the 1st two-input NAND/AND gate; drain of the 1st MOS transistor, drain of the 2nd MOS transistor, grid of the 3rd MOS transistor and drain of the 5th MOS transistor are connected to grid of the 6th MOS transistor, and the connecting terminal is the NAND logic output terminal of the 1st two-input NAND/AND gate; grid of the 2nd MOS transistor, drain of the 3rd MOS transistor, drain of the 4th MOS transistor and grid of the 5th MOS transistor are connected to drain of the 6th MOS transistor, and the connecting terminal is the NAND/AND logic output terminal of the 1st two-input NAND/AND gate; source of the 5th MOS transistor and drain of the 7th MOS transistor are connected to drain of the 8th MOS transistor; source of the 6th MOS transistor, source of the 7th MOS transistor and drain of the 9th MOS transistor are connected to drain of the 11th MOS transistor, grid of the 8th MOS transistor is the 1st input terminal of the 1st two-input NAND/AND gate; grid of the 9th MOS transistor is the 1st inverting input terminal of the 1st two-input NAND/AND gate; grid of the 10th MOS transistor is the 2nd input terminal of the 1st two-input NAND/AND gate; grid of the 11th MOS transistor is the 2nd inverting input terminal of the 1st two-input NAND/AND gate; source of the 8th MOS transistor and source of the 9th MOS transistor are connected to drain of the 10th MOS transistor, source of the 10th MOS transistor and source of the 11th MOS transistor are connected to drain of the 12th MOS transistor, source of the 12th MOS transistor is grounded; circuit structure of the 2nd two-input NAND/AND gate, the 3rd two-input NAND/AND gate, the 4th two-input NAND/AND gate, the 5th two-input NAND/AND gate, the 6th two-input NAND/AND gate, the 7th two-input NAND/AND gate, the 8th two-input NAND/AND gate, the 9th two-input NAND/AND gate, the 10th two-input NAND/AND gate, the 11th two-input NAND/AND gate and the 12th two-input NAND/AND gate are identical to that of the 1st two-input NAND/AND gate;

The 1st three-input NOR/OR gate comprises the 13th MOS transistor, the 14th MOS transistor, the 15th MOS transistor, the 16th MOS transistor, the 17th MOS transistor, the 18th MOS transistor, the 19th MOS transistor, the 20th MOS transistor, the 21st MOS transistor, the 22nd MOS transistor, the 23rd MOS transistor, the 24th MOS transistor, the 25th MOS transistor and the 26th MOS transistor; the 13th MOS transistor, the 14th MOS transistor, the 15th MOS transistor and the 16th MOS transistor belong to PMOS transistors; the 17th MOS transistor, the 18th MOS transistor, the 19th MOS transistor, the 20th MOS transistor, the 21st MOS transistor, the 22nd MOS transistor, the 23rd MOS transistor, the 24th MOS transistor, the 25th MOS transistor and the 26th MOS transistor belong to NMOS transistors; source of the 13th MOS transistor, source of the 14th MOS transistor, source of the 15th MOS transistor and the source of the 16th MOS transistor are connected to grid of the 19th MOS transistor, and the connecting terminal is connected to the power source; grid of the 13th MOS transistor and grid of the 16th MOS transistor are connected to the grid of the 26th MOS transistor, and the connecting terminal is the clock terminal of the 1st three-input NOR/OR gate; drain of the 13th MOS transistor, drain of the 14th MOS transistor, grid of the 15th MOS transistor and drain of the 17th MOS transistor are connected to grid of the 18th MOS transistor, and the connecting terminal is the NOR logic output terminal of the 1st three-input NOR/OR gate; grid of the 14th MOS transistor, drain of the 15th MOS transistor, drain of the 16th MOS transistor and grid of the 17th MOS transistor are connected to drain of the 18th MOS transistor, and the connecting terminal is the OR logic output terminal of the 1st three-input NOR/OR gate; source of the 17th MOS transistor, drain of the 19th MOS transistor, drain of the 20th MOS transistor and drain of the 21st MOS transistor are connected to drain of the 22nd MOS transistor, source of the 18th MOS transistor and source of the 19th MOS transistor are connected to drain of the 23rd MOS transistor; source of the 20th MOS transistor and source of the 23rd MOS transistor are connected to drain of the 24th MOS transistor, source of the 21st MOS transistor and source of the 24th MOS transistor are connected to drain of the 25th MOS transistor; source of the 22nd MOS transistor and source of the 25th MOS transistor are connected to drain of the 26th MOS transistor; source of the 26th MOS transistor is grounded; grid of the 20th MOS transistor is the 1st input terminal of the 1st three-input NOR/OR gate; grid of the 21st MOS transistor is the 2nd input terminal of the 1st three-input NOR/OR gate; grid of the 22nd MOS transistor is the 3rd input terminal of the 1st three-input NOR/OR gate; grid of the 23rd MOS transistor is the 1st inverting input terminal of the 1st three-input NOR/OR gate; grid of the 24th MOS transistor is the 2nd inverting input terminal of the 1st three-input NOR/OR gate; grid of the 25th MOS transistor is the 3rd inverting input terminal of the 1st three-input NOR/OR gate; circuit structure of the 2nd three-input NOR/OR gate, the 3rd three-input NOR/OR gate and the 4th three-input NOR/OR gate is identical to that of the 1st three-input NOR/OR gate.

The 1st master-slave D flip-flop comprises the 27th MOS transistor, the 28th MOS transistor, the 29th MOS transistor, the 30th MOS transistor, the 31st MOS transistor, the 32nd MOS transistor, the 33rd MOS transistor, the 34th MOS transistor, the 35th MOS transistor, the 36th MOS transistor, the 37th MOS transistor, the 38th MOS transistor, the 39th MOS transistor, the 40th MOS transistor, the 41st MOS transistor, the 42nd MOS transistor, the 43rd MOS transistor, the 44th MOS transistor, the 45th MOS transistor, the 46th MOS transistor, the 47th MOS transistor, the 48th MOS transistor, the 49th MOS transistor, the 50th MOS transistor, the 51st MOS transistor, the 52nd MOS transistor, the 53rd MOS transistor, the 54th MOS transistor, the 55th MOS transistor and the 56th MOS transistor; the 27th MOS transistor, the 28th MOS transistor, the 29th MOS transistor, the 30th MOS transistor, the 31st MOS transistor, the 32nd MOS transistor, the 37th MOS transistor, the 38th MOS transistor, the 48th MOS transistor, the 49th MOS transistor, the 50th MOS transistor, the 51st MOS transistor, the 52nd MOS transistor, the 53rd MOS transistor and the 54th MOS transistor belong to PMOS transistors; the 33rd MOS transistor, the 34th MOS transistor, the 35th MOS transistor, the 36th MOS transistor, the 39th MOS transistor, the 40th MOS transistor, the 41$^{st}$ MOS transistor, the 42$^{nd}$ MOS transistor, the 43$^{rd}$ MOS transistor, the 44$^{th}$ MOS transistor, the 45$^{th}$ MOS transistor, the 46$^{th}$ MOS transistor, the 47$^{th}$ MOS transistor, the 55$^{th}$ MOS transistor and the 56$^{th}$ MOS transistor belong to NMOS transistors; source of the 27$^{th}$ MOS transistor, source of the 37$^{th}$ MOS transistor, grid of the 45$^{th}$ MOS transistor, source of the 48$^{th}$ MOS transistor, source of the 49$^{th}$ MOS transistor, source of the 50$^{th}$ MOS transistor, source of the 51$^{st}$ MOS transistor and source of the 52$^{nd}$ MOS transistor are connected to source of the 53$^{rd}$ MOS transistor, and the connecting terminal is connected to the power source; grid of the 27$^{th}$ MOS transistor, grid of the 33$^{rd}$ MOS transistor, grid of the 36$^{th}$ MOS transistor, grid of the 42$^{nd}$ MOS transistor and grid of the 48$^{th}$ MOS transistor are connected to grid of the 51$^{st}$ MOS transistor, and the connecting terminal is the clock terminal of the 1$^{st}$ master-slave D flip-flop; drain of the 27$^{th}$ MOS transistor and source of the 28$^{th}$ MOS transistor are connected to source of the 29$^{th}$ MOS transistor; grid of the 28$^{th}$ MOS transistor is input terminal of the 1$^{st}$ master-slave D flip-flop; drain of the 28$^{th}$ MOS transistor and drain of the 30$^{th}$ MOS transistor are connected to source of the 31$^{st}$ MOS transistor; grid of the 29$^{th}$ MOS transistor is inverting input terminal of the 1$^{st}$ master-slave D flip-flop; drain of the 29$^{th}$ MOS transistor and source of the 30$^{th}$ MOS transistor are connected to source of the 32$^{nd}$ MOS transistor, grid of the 30$^{th}$ MOS transistor is grounded; drain of the 31$^{st}$ MOS transistor, grid of the 32$^{nd}$ MOS transistor, drain of the 33$^{rd}$ MOS transistor, drain of the 34$^{th}$ MOS transistor, grid of the 35$^{th}$ MOS transistor and grid of the 37$^{th}$ MOS transistor are connected to grid of the 40$^{th}$ MOS transistor; grid of the 31$^{st}$ MOS transistor, grid of the 34$^{th}$ MOS transistor, drain of the 32$^{nd}$ MOS transistor, drain of the 35$^{th}$ MOS transistor, drain of the 36$^{th}$ MOS transistor and grid of the 53$^{rd}$ MOS transistor are connected to grid of the 56$^{th}$ MOS transistor; source of the 33$^{rd}$ MOS transistor, source of the 34$^{th}$ MOS transistor, source of the 35$^{th}$ MOS transistor and source of the 36$^{th}$ MOS transistor are grounded; drain of the 37$^{th}$ MOS transistor is connected to source of the 38$^{th}$ MOS transistor; grid of the 38$^{th}$ MOS transistor and grid of the 41$^{st}$ MOS transistor are connected to grid of the 54$^{th}$ MOS transistor, and the connecting terminal is the reset terminal of the 1$^{st}$ master-slave D flip-flop; drain of the 38$^{th}$ MOS transistor, drain of the 39$^{th}$ MOS transistor and drain of the 41$^{st}$ MOS transistor are connected to grid of the 43$^{rd}$ MOS transistor, grid of the 39$^{th}$ MOS transistor and grid of the 52$^{nd}$ MOS transistor are connected to grid of the 55$^{th}$ MOS transistor, and the connecting terminal is the inverting reset terminal of the 1$^{st}$ master-slave D flip-flop; source of the 39$^{th}$ MOS transistor is connected to drain of the 40$^{th}$ MOS transistor; source of the 40$^{th}$ MOS transistor and source of the 41$^{st}$ MOS transistor are grounded; source of the 42$^{nd}$ MOS transistor is grounded; drain of the 42$^{nd}$ MOS transistor and source of the 43$^{rd}$ MOS transistor are connected to source of the 44$^{th}$ MOS transistor, drain of the 43$^{rd}$ MOS transistor and drain of the 45$^{th}$ MOS transistor are connected to source of the 46$^{th}$ MOS transistor, grid of the 44$^{th}$ MOS transistor, drain of the 52$^{nd}$ MOS transistor and drain of the 54$^{th}$ MOS transistor are connected to drain of the 55$^{th}$ MOS transistor, drain of the 44$^{th}$ MOS transistor and source of the 45$^{th}$ MOS transistor are connected to source of the 47$^{th}$ MOS transistor, grid of the 46$^{th}$ MOS transistor, grid of the 49$^{th}$ MOS transistor, drain of the 47$^{th}$ MOS transistor and drain of the 50$^{th}$ MOS transistor are connected to drain of the 51$^{st}$ MOS transistor, and the connecting terminal is output terminal of the 1$^{st}$ master-slave D flip-flop; drain of the 46$^{th}$ MOS transistor, drain of the 48$^{th}$ MOS transistor, drain of the 49$^{th}$ MOS transistor and grid of the 47$^{th}$ MOS transistor are connected to grid of the 50$^{th}$ MOS transistor, and the connecting terminal is inverting output terminal of the 1$^{st}$ master-slave D flip-flop; drain of the 53$^{rd}$ MOS transistor is connected to source of the 54$^{th}$ MOS transistor, source of the 55$^{th}$ MOS transistor is connected to drain of the 56$^{th}$ MOS transistor; source of the 56$^{th}$ MOS transistor is grounded; circuit structure of the 2$^{nd}$ master-slave D flip-flop, 3$^{rd}$ master-slave D flip-flop and 4$^{th}$ master-slave D flip-flop is identical to that of the 1$^{st}$ master-slave D flip-flop.

As compared with prior arts, the advantage of the present invention lies in the use of conventional shift register principle and sensitive amplifying logic circuit; the shift register is formed by 4 master-slave D flip-flops, 12 two-input NAND/AND gates, 4 three-input NOR/OR gates and 40 inverters; the 4 master-slave D flip-flops are provided with reset function based on TSMC 65 mm CMOS technique; as indicated by Spectre simulation verification, the shift register of the present invention has correct logic function with NED and NSD below 2.66% and 0.63% respectively under multi PVT combinations, which is provided with significant performance in defense differential power consumption analysis.

DESCRIPTION OF EMBODIMENTS

The present invention is further described as follows in combination with embodiments for drawings.

Embodiment 1

Figure 1:
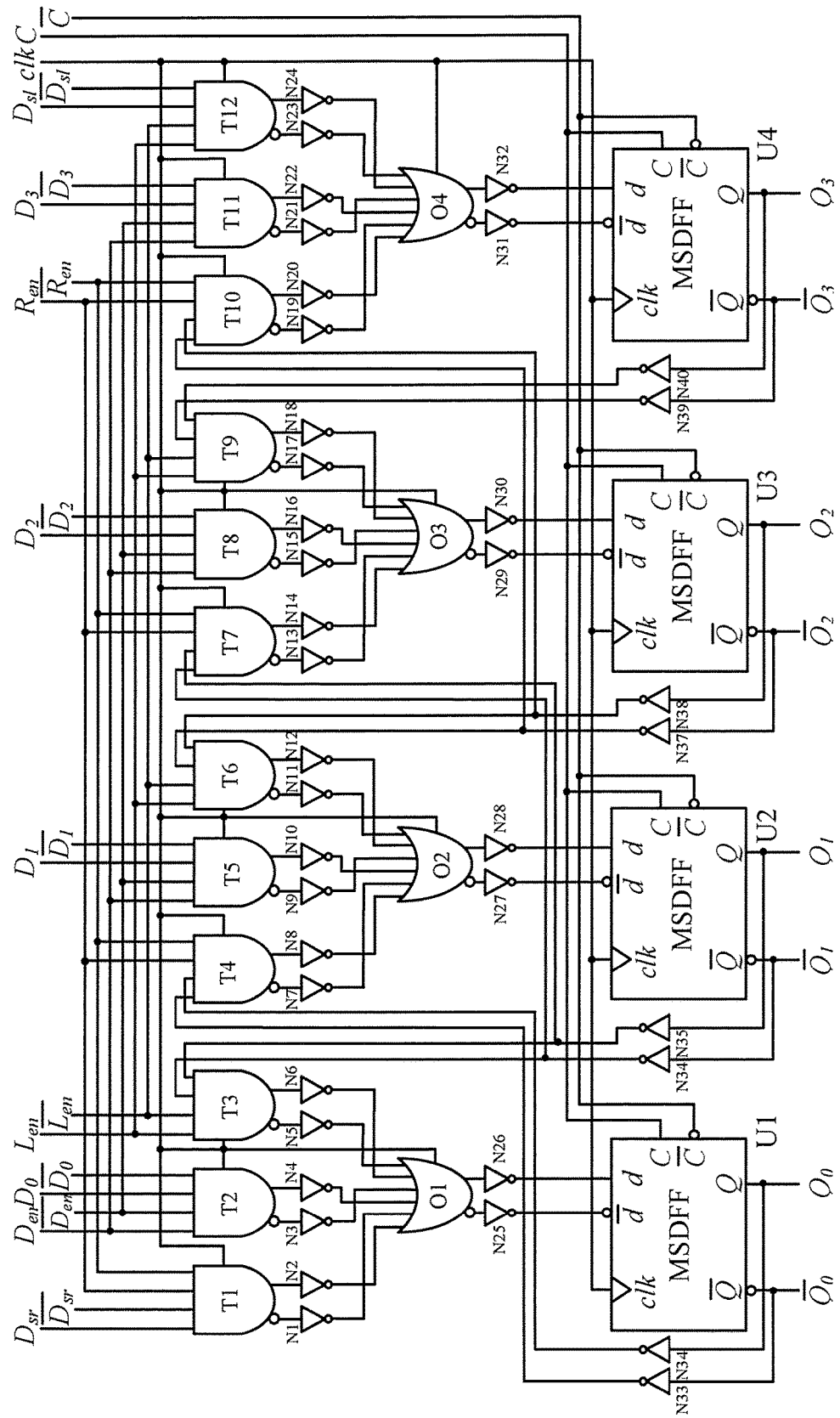
FIG. 1 is the structural diagram for the shift register capable of defending against DPA attack according to the present invention.

A shift register capable of defending against DPA attack as shown in FIG. 1, comprising the 1st master-slave D flip-flop U1, the 2nd master-slave D flip-flop U2, the 3rd master-slave D flip-flop U3 and the 4th master-slave D flip-flop U4, the 1st two-input NAND/AND gate T1, the 2nd two-input NAND/AND gate T2, the 3rd two-input NAND/ AND gate T3, the 4th two-input NAND/AND gate T4, the 5th two-input NAND/AND gate T5, the 6th two-input NAND/AND gate T6, the 7th two-input NAND/AND gate T7, the 8th two-input NAND/AND gate T8, the 9th two-input NAND/AND gate T9, the 10th two-input NAND/ AND gate T10, the 11th two-input NAND/AND gate T11 and the 12th two-input NAND/AND gate T12, the 1st three-input NOR/OR gate O1, the 2nd three-input NOR/OR gate O2, the 3rd three-input NOR/OR gate O3 and the 4th three-input NOR/OR gate O4, the 1st inverter N1, the 2nd inverter N2, the 3rd inverter N3, the 4th inverter N4, the 5th inverter N5, the 6th inverter N6, the 7th inverter N7, the 8th inverter N8, the 9th inverter N9, the 10th inverter N10, the 11th inverter N11, the 12th inverter N12, the 13th inverter N12, the 14th inverter N14, the 15th inverter N15, the 16th inverter N16, the 17th inverter N17, the 18th inverter N18, the 19th inverter N19, the 20th inverter N20, the 21st inverter N21, the 22nd inverter N22, the 23rd inverter N23, the 24th inverter N24, the 25th inverter N25, the 26th inverter N26, the 27th inverter N27, the 28th inverter N28, the 28th inverter N28, the 29th inverter N29, the 30th inverter N30, the 31st inverter N31, the 32nd inverter N32, the 33rd inverter N33, the 34th inverter N34, the 35th inverter N35, the 36th inverter N36, the 37th inverter N37, the 38th inverter N38, the 39th inverter N39 and the 40th inverter N40; the 1st master-slave D flip-flop U1, the 2nd master-slave D flip-flop U2, the 3rd master-slave D flip-flop U3 and the 4th master-slave D flip-flop U4 are provided with a clock terminal, an input terminal, an inverting input terminal, an output terminal, an inverting output terminal, a reset terminal and an inverting reset terminal; the 1st two-input NAND/AND gate T1, the 2nd two-input NAND/AND gate T2, the 3rd two-input NAND/AND gate T3, the 4th two-input NAND/AND gate T4, the 5th two-input NAND/ AND gate T5, the 6th two-input NAND/AND gate T6, the 7th two-input NAND/AND gate T7, the 8th two-input NAND/AND gate T8, the 9th two-input NAND/AND gate T9, the 10th two-input NAND/AND gate T10, the 11th two-input NAND/AND gate T11 and the 12th two-input NAND/AND gate T12 are provided with a clock terminal, the $1^{st}$ input terminal, the $1^{st}$ inverting input terminal, the $2^{nd}$ input terminal, the $2^{nd}$ inverting input terminal, a NAND logic output terminal and a AND logic output terminal; the 1st three-input NOR/OR gate O1, the 2nd three-input NOR/ OR gate O2, the 3rd three-input NOR/OR gate O3 and the 4th three-input NOR/OR gate O4 are provided with a clock terminal, the $1^{st}$ input terminal, the $1^{st}$ inverting input terminal, the $2^{nd}$ input terminal, the $2^{nd}$ inverting input terminal, the $3^{rd}$ input terminal, the $3^{rd}$ inverting input terminal, a NOR logic output terminal and an OR logic output terminal; clock terminal of the 1st two-input NAND/AND gate T1, clock terminal of the 2nd two-input NAND/AND gate T2, clock terminal of the 3rd two-input NAND/AND gate T3, clock terminal of the 4th two-input NAND/AND gate T4, clock terminal of the 5th two-input NAND/AND gate T5, clock terminal of the 6th two-input NAND/AND gate T6, clock terminal of the 7th two-input NAND/AND gate T7, clock terminal of the 8th two-input NAND/AND gate T8, clock terminal of the 9th two-input NAND/AND gate T9, clock terminal of the 10th two-input NAND/AND gate T10, clock terminal of the 11th two-input NAND/AND gate T11, clock terminal of the 12th two-input NAND/AND gate T12, clock terminal of the 1st three-input NOR/OR gate O1, clock terminal of the 2nd three-input NOR/OR gate O2, clock terminal of the 3rd three-input NOR/OR gate O3, clock terminal of the 4th three-input NOR/OR gate O4, clock terminal of the 1st master-slave D flip-flop U1, clock terminal of the 2nd master-slave D flip-flop U2 and clock terminal of the 3rd master-slave D flip-flop U3 are connected to clock terminal of the 4th master-slave D flip-flop U4, and the connecting terminal is clock terminal of the said shift register, the $1^{st}$ input terminal of the 1st two-input NAND/ AND gate T1 is the right shift signal input terminal of the said shift register for input of right shift input signal; the $1^{st}$ inverting input terminal of the 1st two-input NAND/AND gate T1 is the inverting right shift signal input terminal of the said shift register for input of inverting right shift input signal $\overline{D_{sr}}$; the $2^{nd}$ input terminal of the 1st two-input NAND/AND gate T1, the $2^{nd}$ input terminal of the 4th two-input NAND/AND gate T4 and the $2^{nd}$ input terminal of the 7th two-input NAND/AND gate T7 are connected to the $2^{nd}$ input terminal of the 10th two-input NAND/AND gate T10, and the connecting terminal is the right shift enabling signal input terminal of the said shift register for input of right shift enabling signal $R_{en}$; the $2^{nd}$ inverting input terminal of the 1st two-input NAND/AND gate T1, the $2^{nd}$ inverting input terminal of the 4th two-input NAND/AND gate T4 and the $2^{nd}$ inverting input terminal of the 7th two-input NAND/AND gate T7 are connected to the $2^{nd}$ inverting input terminal of the 10th two-input NAND/AND gate T10, and the connecting terminal is the inverting right shift enabling signal input terminal of the said shift register for input of inverting right shift enabling signal $\overline{R_{en}}$; the $1^{st}$ input terminal of the 2nd two-input NAND/AND gate T2, the $1^{st}$ input terminal of the 5th two-input NAND/AND gate T5 and the $1^{st}$ input terminal of the 8th two-input NAND/ AND gate T8 are connected to the $1^{st}$ input terminal of the 11th two-input NAND/AND gate T11, and the connecting terminal of the parallel-in-out enabling signal $D_{en}$ input terminal of the said shift register, the $1^{st}$ inverting input terminal of the 2nd two-input NAND/AND gate T2, the $1^{st}$ inverting input terminal of the 5th two-input NAND/AND gate T5 and the $1^{st}$ inverting input terminal of the 8th two-input NAND/AND gate T8 are connected to the $1^{st}$ inverting input terminal of the 11th two-input NAND/AND gate T11, and the connecting terminal is the inverting parallel-in-out enabling signal input terminal of the said shift register for input of inverting parallel-in-out enabling signal $\overline{D_{en}}$; the $2^{nd}$ input terminal of the 2nd two-input NAND/ AND gate T2 is the $1^{st}$ input terminal of the said shift register for input of the $1^{st}$ bit signal $D_0$ of the 4-bit parallel-in-out input signal $D_3D_2D_1D_0$; the $2^{nd}$ inverting input terminal of the 2nd two-input NAND/AND gate T2 is the $1^{st}$ inverting input terminal of the said shift register for input of the $1^{st}$ bit signal $D_0$ of 4-bit inverting parallel input signal $\overline{D_3D_2D_1D_0}$; the $2^{nd}$ input terminal of the 5th two-input NAND/AND gate T5 is the $2^{nd}$ input terminal of the said shift register for input of the $2^{nd}$ bit signal $D_1$ of 4-bit parallel input signal $D_3D_2D_1D_0$; the $2^{nd}$ inverting input terminal of the 5th two-input NAND/AND gate T5 is the $2^{nd}$ inverting input terminal of the said shift register for input of the $2^{nd}$ bit signal $D_1$ of 4-bit inverting parallel input signal $\overline{D_3D_2D_1D_0}$; the $2^{nd}$ input terminal of the 8th two-input NAND/AND gate T8 is the $3^{rd}$ input terminal of the said shift register for input of the $3^{rd}$ bit signal $D_2$ of 4-bit parallel input signal $D_3D_2D_1D_0$; the $2^{nd}$ inverting input terminal of the 8th two-input NAND/AND gate T8 is the $3^{rd}$ inverting input terminal of the said shift register for input of the $3^{rd}$ bit signal $D_2$ of 4-bit inverting parallel input signal $\overline{D_3D_2D_1D_0}$; the $2^{nd}$ input terminal of the 11th two-input NAND/AND gate T11 is the $4^{th}$ input terminal of the said shift register for input of the $4^{th}$ bit signal $D_3$ of 4-bit parallel input signal $D_3D_2D_1D_0$; the $2^{nd}$ inverting input terminal of the 11th two-input NAND/AND gate T11 is the $4^{th}$ inverting input terminal of the said shift register for input of the $4^{th}$ bit signal $D_3$ of 4-bit inverting parallel input signal $\overline{D_3D_2D_1D_0}$; the $1^{st}$ input terminal of the 3rd two-input NAND/AND gate T3, the $1^{st}$ input terminal of the 6th two-input NAND/AND gate T6 and the $1^{st}$ input terminal of the 9th two-input NAND/AND gate T9 are connected to the $1^{st}$ input terminal of the 12th two-input NAND/AND gate T12, and the connecting terminal is the left shift enabling signal $L_{en}$ input terminal of the said shift register for input of left shift enabling signal $L_{en}$; the $1^{st}$ inverting input signal of the 3rd two-input NAND/AND gate T3, the $1^{st}$ inverting input signal of the 6th two-input NAND/AND gate T6 and the $1^{st}$ inverting input terminal of the 9th two-input NAND/AND gate T9 are connected to the $1^{st}$ inverting input terminal of the 12th two-input NAND/AND gate T12, and the connecting terminal is the inverting left shift enabling signal $\overline{L_{en}}$ input terminal of the said shift register for input of the inverting left shift enabling signal $\overline{L_{en}}$; the $2^{nd}$ input terminal of the 3rd two-input NAND/AND gate T3 and the $1^{st}$ input terminal of the 7th two-input NAND/AND gate T7 are connected to the output terminal of the 35th inverter N35; the $2^{nd}$ inverting input terminal of the 3rd two-input NAND/AND gate T3 and the $1^{st}$ inverting input terminal of the 7th two-input NAND/AND gate T7 are connected to the output terminal of the 36th inverter N36; the $1^{st}$ input terminal of the 4th two-input NAND/AND gate T4 is connected to the output terminal of the 33rd inverter N33; the $1^{st}$ inverting input terminal of the $4^{th}$ two-input NAND/AND is connected to the output terminal of the 34th inverter N34; the $2^{nd}$ input terminal of the 6th two-input NAND/AND gate T6 and the $1^{st}$ input terminal of the 10th two-input NAND/AND gate T10 are connected to the output terminal of the 37th inverter N37; the $2^{nd}$ inverting input terminal of the 6th two-input NAND/AND gate T6 and the $1^{st}$ inverting input terminal of the 10th two-input NAND/AND gate T10 are connected to the output terminal of the 38th inverter N38; the $2^{nd}$ input terminal of the 9th two-input NAND/AND gate T9 is connected to the output terminal of the 39th inverter N39; the $2^{nd}$ inverting input terminal of the 9th two-input NAND/AND gate T9 is connected to the output terminal of the 40th inverter N40; the $2^{nd}$ input terminal of the 12th two-input NAND/AND gate T12 is the left shift signal input terminal of the said shift register for input of left shift input signal; the $2^{nd}$ inverting input terminal of the 12th two-input NAND/AND gate T12 is the inverting left shift signal input terminal of the said shift register for input of inverting left shift input signal; the AND logic output terminal of the 1st two-input NAND/AND gate T1 is connected to input terminal of the 1st inverter N1; output terminal of the 1st inverter N1 is connected to the $1^{st}$ inverting input terminal of the 1st three-input NOR/OR gate O1; NAND logic output terminal of the 1st two-input NAND/AND gate T1 is connected to input terminal of the 2nd inverter N2; output terminal of the 2nd inverter N2 is connected to the $1^{st}$ input terminal of the 1st three-input NOR/OR gate O1; AND logic output terminal of the 2nd two-input NAND/AND gate T2 is connected to input terminal of the 3rd inverter N3; output terminal of the 3rd inverter N3 is connected to the $2^{nd}$ inverting input terminal of the 1st three-input NOR/OR gate O1; NAND logic output terminal of the 2nd two-input NAND/AND gate T2 is connected to input terminal of the 4th inverter N4; output terminal of the 4th inverter N4 is connected to the $2^{nd}$ input terminal of the 1st three-input NOR/OR gate O1; AND logic output terminal of the 3rd two-input NAND/AND gate T3 is connected to input terminal of the 5th inverter N5; output terminal of the 5th inverter N5 is connected to the $3^{rd}$ inverting input terminal of the 1st three-input NOR/OR gate O1; NAND logic output terminal of the 3rd two-input NAND/AND gate T3 is connected to input terminal of the 6th inverter N6; output terminal of the 6th inverter N6 is connected to the $3^{rd}$ input terminal of the 1st three-input NOR/OR gate O1; AND logic output terminal of the $4^{th}$ two-input NOR/OR gate is connected to input terminal of the 7th inverter N7; output terminal of the 7th inverter N7 is connected to the $1^{st}$ inverting input terminal of the $2^{nd}$ NAND/AND inverting input terminal; NAND logic output terminal of the 4th two-input NAND/AND gate T4 is connected to input terminal of the 8th inverter N8; output terminal of the 8th inverter N8 is connected to the $1^{st}$ input terminal of the 2nd three-input NOR/OR gate O2; AND logic output terminal of the 5th two-input NAND/AND gate T5 is connected to input terminal of the 9th inverter N9; input terminal of the 9th inverter N9 is connected to the $2^{nd}$ inverting input terminal of the 2nd three-input NOR/OR gate O2; NAND logic output terminal of the 5th two-input NAND/AND gate T5 is connected to input terminal of the 10th inverter N10; output terminal of the 10th inverter N10 is connected to the $2^{nd}$ input terminal of the 2nd three-input NOR/OR gate O2; AND logic output terminal of the 6th two-input NAND/AND gate T6 is connected to input terminal of the 11th inverter N11; output terminal of the 11th inverter N11 is connected to the $3^{rd}$ inverting input terminal of the 2nd three-input NOR/OR gate O2; NAND logic output terminal of the $6^{th}$ input NAND/AND gate is connected to input terminal of the 12th inverter N12; output terminal of the 12th inverter N12 is connected to the $3^{rd}$ input terminal of the $2^{nd}$ three-input NAND/AND gate; AND logic output terminal of the 7th two-input NAND/AND gate T7 is connected to input terminal of the 13th inverter N13; output terminal of the 13th inverter N12 is connected to the $1^{st}$ inverting input terminal of the 3rd three-input NOR/OR gate O3; NAND logic output terminal of the 7th two-input NAND/AND gate T7 is connected to input terminal of the 14th inverter N14; output terminal of the 14th inverter N14 is connected to the $1^{st}$ input terminal of the 3rd three-input NOR/OR gate O3; AND logic output terminal of the 8th two-input NAND/AND gate T8 is connected to input terminal of the 15th inverter N15; output terminal of the 15th inverter N15 is connected to the $2^{nd}$ inverting input terminal of the 3rd three-input NOR/OR gate O3; NAND logic output terminal of the 8th two-input NAND/AND gate T8 is connected to input terminal of the 16th inverter N16; output terminal of the 16th inverter N16 is connected to the $2^{nd}$ input terminal of the $3^{rd}$ three-input NAND/AND gate; AND logic output terminal of the 9th two-input NAND/AND gate T9 is connected to input terminal of the 17th inverter N17; output terminal of the 17th inverter N17 is connected to the $3^{rd}$ inverting input terminal of the 3rd three-input NOR/OR gate O3; NAND logic output terminal of the 9th two-input NAND/AND gate T9 is connected to input terminal of the 18th inverter N18; output terminal of the 18th inverter N18 is connected to the $3^{rd}$ input terminal of the 3rd three-input NOR/OR gate O3; AND logic output terminal of the 10th two-input NAND/AND gate T10 is connected to input terminal of the 19th inverter N19; output terminal of the 19th inverter N19 is connected to the $1^{st}$ inverting input terminal of the 4th three-input NOR/OR gate O4; NAND logic output terminal of the 10th two-input NAND/AND gate T10 is connected to input terminal of the 20th inverter N20; output terminal of the 20th inverter N20 is connected to the $1^{st}$ input terminal of the 4th three-input NOR/OR gate O4; AND logic output terminal of the 11th two-input NAND/AND gate T11 is connected to input terminal of the 21st inverter N21; output terminal of the 21st inverter N21 is connected to the $2^{nd}$ inverting input terminal of the 4th three-input NOR/OR gate O4; NAND logic output terminal of the 11th two-input NAND/AND gate T11 is connected to input terminal of the 22nd inverter N22; output terminal of the 22nd inverter N22 is connected to the $2^{nd}$ input terminal of the $4^{th}$ three-input NAND/AND gate; AND logic output terminal of the 12th two-input NAND/AND gate T12 is connected to input terminal of the 23rd inverter N23; output terminal of the 23rd inverter N23 is connected to the $3^{rd}$ inverting input terminal of the $4^{th}$ three-input NAND/AND gate; NAND logic output terminal of the 12th two-input NAND/AND gate T12 is connected to input terminal of the 24th inverter N24; output terminal of the 24th inverter N24 is connected to the $3^{rd}$ input terminal of the 4th three-input NOR/OR gate O4; OR logic output terminal of the 1st three-input NOR/OR gate O1 is connected to input terminal of the 25th inverter N25; output terminal of the 25th inverter N25 is connected to inverting input terminal of the 1st master-slave D flip-flop U1; NOR logic output terminal of the 1st three-input NOR/OR gate O1 is connected to input terminal of the 26th inverter N26; output terminal of the 26th inverter N26 is connected to input terminal of the 1st master-slave D flip-flop U1; OR logic output terminal of the 2nd three-input NOR/OR gate O2 is connected to input terminal of the 27th inverter N27; output terminal of the 27th inverter N27 is connected to inverting input terminal of the 2nd master-slave D flip-flop U2; NOR logic output terminal of the 2nd three-input NOR/OR gate O2 is connected to input terminal of the 28th inverter N28; output terminal of the 28th inverter N28 is connected to input terminal of the 2nd master-slave D flip-flop U2; OR logic output terminal of the 3rd three-input NOR/OR gate O3 is connected to input terminal of the 29th inverter N29; output terminal of the 29th inverter N29 is connected to inverting input terminal of the 3rd master-slave D flip-flop U3; NOR logic output terminal of the 3rd three-input NOR/OR gate O3 is connected to input terminal of the 30th inverter N30; output terminal of the 30th inverter N30 is connected to input terminal of the 3rd master-slave D flip-flop U3; OR logic output terminal of the 4th three-input NOR/OR gate O4 is connected to input terminal of the 31st inverter N1; output terminal of the 31st inverter N1 is connected to inverting input terminal of the 4th master-slave D flip-flop U4; NOR logic output terminal of the 4th three-input NOR/OR gate O4 is connected to the 32nd inverter N32; output terminal of the 32nd inverter N32 is connected to input terminal of the 4th master-slave D flip-flop U4; reset terminal of the 1st master-slave D flip-flop U1, reset terminal of the 2nd master-slave D flip-flop U2 and reset terminal of the 3rd master-slave D flip-flop U3 are connected to reset terminal of the 4th master-slave D flip-flop U4, and the connecting terminal is reset terminal of the said shift register for input of reset signal C; inverting reset terminal of the 1st master-slave D flip-flop U1, inverting reset terminal of the 2nd master-slave D flip-flop U2 and inverting reset terminal of the 3rd master-slave D flip-flop U3 are connected to inverting reset terminal of the 4th master-slave D flip-flop U4, and the connecting terminal is inverting reset terminal of the said shift register for input of inverting reset signal $\overline{C}$; input terminal of the 33rd inverter N33 is connected to inverting output terminal of the 1st master-slave D flip-flop U1, and the connecting terminal is the $1^{st}$ inverting output terminal of the said shift register for output of the $1^{st}$ bit inverting output signal $\overline{Q_0}$; input terminal of the 34th inverter N34 is connected to output terminal of the 1st master-slave D flip-flop U1, and the connecting terminal is the $1^{st}$ output terminal of the said shift register for output of the $1^{st}$ bit output signal $Q_0$; input terminal of the 35th inverter N35 is connected to inverting output terminal of the 2nd master-slave D flip-flop U2, and the connecting terminal is the $2^{nd}$ inverting output terminal of the said shift register for output of the $2^{nd}$ bit inverting output signal $\overline{Q_1}$; input of the 36th inverter N36 is connected to output terminal of the 2nd master-slave D flip-flop U2, and the connecting terminal is the $2^{nd}$ output terminal of the said shift register for output of the $2^{nd}$ bit output signal $Q_1$; input terminal of the 37th inverter N37 is connected to inverting output terminal of the 3rd master-slave D flip-flop U3, and the connecting terminal is the $3^{rd}$ inverting output terminal of the said shift register for output of the $3^{rd}$ bit inverting output signal $\overline{Q_2}$; input terminal of the 38th inverter N38 is connected to output terminal of the 3rd master-slave D flip-flop U3, and the connecting terminal is the $3^{rd}$ output terminal of the said shift register for output of the $3^{rd}$ bit output signal $Q_2$; input terminal of the 39th inverter N39 is connected to inverting output terminal of the 4th master-slave D flip-flop U4, and the connecting terminal is the $4^{th}$ inverting output terminal of the said shift register for output of the $4^{th}$ bit inverting output signal $\overline{Q_3}$; input terminal of the 40th inverter N40 is connected to output terminal of the 4th master-slave D flip-flop U4, and the connecting terminal is the $4^{th}$ output terminal of the said shift register for output of the $4^{th}$ bit output signal $Q_3$.

Embodiment 2

Figure 2:
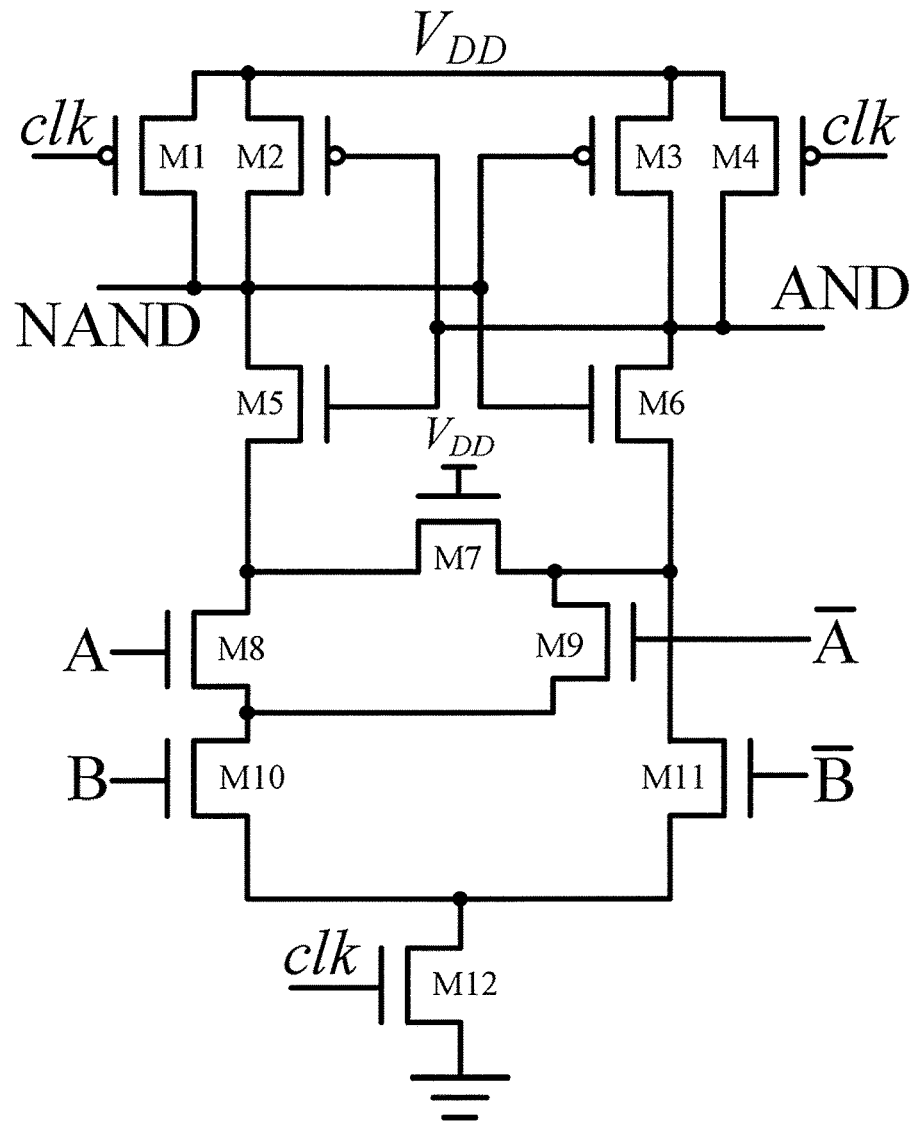
FIG. 2(a) is the circuit diagram for the 1$^{st}$ two-input NAND/AND gate according to the present invention.
FIG. 2(b) is the graphical diagram for the 1$^{st}$ two-input NAND/AND gate according to the present invention.
Figure 2:
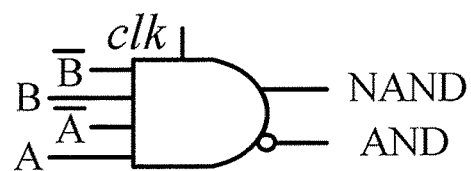
Figure 3:
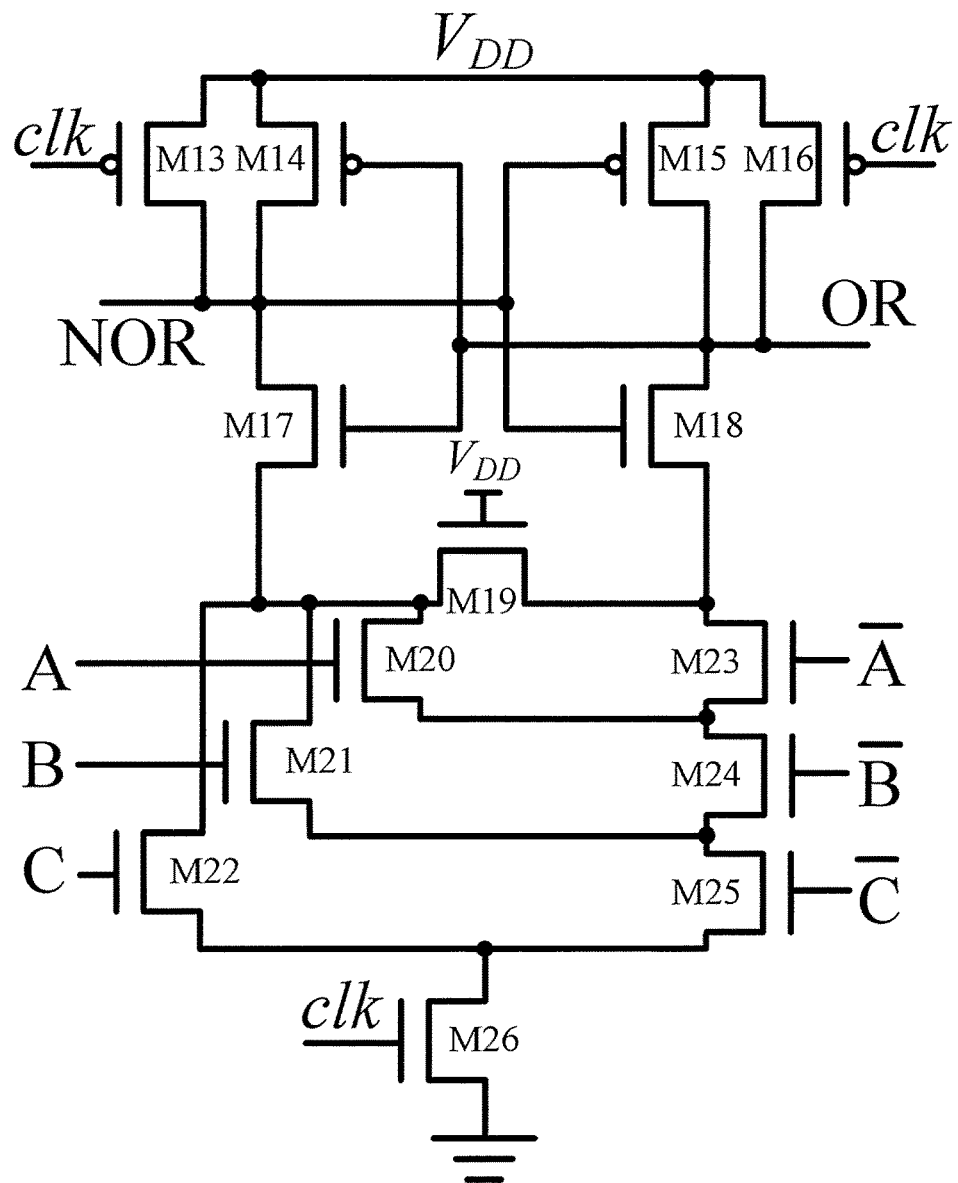
FIG. 3(a) is the circuit diagram for the 1$^{st}$ three-input NOR/OR gate according to the present invention.
FIG. 3(b) is the graphical diagram for the 1$^{st}$ three-input NOR/OR gate according to the present invention.
Figure 3:
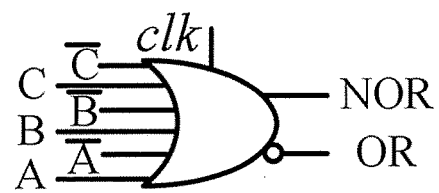

This embodiment is basically identical to Embodiment 1; the difference lies in the fact that in this embodiment as shown in FIGS. 2(a) and 2(b), the $1^{st}$ two-input NAND/AND gate T1 comprises the $1^{st}$ MOS transistor M1, the $2^{nd}$ MOS transistor M2, the $3^{rd}$ MOS transistor M3, the $4^{th}$ MOS transistor M4, the $5^{th}$ MOS transistor M5, the $6^{th}$ MOS transistor M6, the $7^{th}$ MOS transistor M7, the $8^{th}$ MOS transistor M8, the $9^{th}$ MOS transistor M9, the $10^{th}$ MOS transistor M10, the $11^{th}$ MOS transistor M11 and the $12^{th}$ MOS transistor M12; the $1^{st}$ MOS transistor M1, the $2^{nd}$ MOS transistor M2, the $3^{rd}$ MOS transistor M3 and the $4^{th}$ MOS transistor M4 belong to PMOS transistors; the $5^{th}$ MOS transistor M5, the $6^{th}$ MOS transistor M6, the $7^{th}$ MOS transistor M7, the $8^{th}$ MOS transistor M8, the $9^{th}$ MOS transistor M9, the $10^{th}$ MOS transistor M10, the $11^{th}$ MOS transistor M11 and the $12^{th}$ MOS transistor M12 belong to NMOS transistors; source of the $1^{st}$ MOS transistor M1, source of the $2^{nd}$ MOS transistor M2, source of the $3^{rd}$ MOS transistor M3 and source of the $4^{th}$ MOS transistor M4 are connected to grid of the $7^{th}$ MOS transistor M7, and the connecting terminal is connected to the power source VDD; grid of the $1^{st}$ MOS transistor M1 and the $4^{th}$ MOS transistor M4 are connected to grid of the $12^{th}$ MOS transistor M12, and the connecting terminal is clock terminal of the $1^{st}$ two-input NAND/AND gate T1; drain of the $1^{st}$ MOS transistor M1, drain of the $2^{nd}$ MOS transistor M2, grid of the $3^{rd}$ MOS transistor M3 and drain of the $5^{th}$ MOS transistor M5 are connected to grid of the $6^{th}$ MOS transistor M6, and the connecting terminal is the NAND logic output terminal of the $1^{st}$ two-input NAND/AND gate T1; grid of the $2^{nd}$ MOS transistor M2, drain of the $3^{rd}$ MOS transistor M3, drain of the $4^{th}$ MOS transistor M4 and grid of the $5^{th}$ MOS transistor M5 are connected to drain of the $6^{th}$ MOS transistor M6, and the connecting terminal is the NAND/AND logic output terminal of the $1^{st}$ two-input NAND/AND gate T1; source of the $5^{th}$ MOS transistor M5 and drain of the $7^{th}$ MOS transistor M7 are connected to drain of the $8^{th}$ MOS transistor M8; source of the 6$^{th}$ MOS transistor M6, source of the 7$^{th}$ MOS transistor M7 and drain of the 9$^{th}$ MOS transistor M9 are connected to drain of the 11$^{th}$ MOS transistor M11; grid of the 8$^{th}$ MOS transistor M8 is the 1$^{st}$ input terminal of the 1$^{st}$ two-input NAND/AND gate T1; grid of the 9$^{th}$ MOS transistor M9 is the 1$^{st}$ inverting input terminal of the 1$^{st}$ two-input NAND/AND gate T1; grid of the 10$^{th}$ MOS transistor M10 is the 2$^{nd}$ input terminal of the 1$^{st}$ two-input NAND/AND gate T1; grid of the 11$^{th}$ MOS transistor M1 is the 2$^{nd}$ inverting input terminal of the 1$^{st}$ two-input NAND/AND gate T1; source of the 8$^{th}$ MOS transistor M8 and source of the 9$^{th}$ MOS transistor M9 are connected to drain of the 10$^{th}$ MOS transistor M10; source of the 10$^{th}$ MOS transistor M10 and source of the 11$^{th}$ MOS transistor M11 are connected to drain of the 12$^{th}$ MOS transistor M12; source of the 12$^{th}$ MOS transistor M12 is grounded; circuit structure of the 2$^{nd}$ two-input NAND/AND gate T2, the 3$^{rd}$ two-input NAND/AND gate T3, the 4$^{th}$ two-input NAND/AND gate T4, the 5$^{th}$ two-input NAND/AND gate T5, the 6$^{th}$ two-input NAND/AND gate T6, the 7$^{th}$ two-input NAND/AND gate T7, the 8$^{th}$ two-input NAND/AND gate T8, the 9$^{th}$ two-input NAND/AND gate T9, the 10$^{th}$ two-input NAND/AND gate T10, the 11$^{th}$ two-input NAND/AND gate T11 and the 12$^{th}$ two-input NAND/AND gate T12 are identical to that of the 1$^{st}$ two-input NAND/AND gate T1;

In this embodiment as shown in FIGS. 3(a) and 3(b), the 1$^{st}$ three-input NOR/OR gate O1 comprises the 13$^{th}$ MOS transistor M13, the 14$^{th}$ MOS transistor M14, the 15$^{th}$ MOS transistor M15, the 16$^{th}$ MOS transistor M16, the 17$^{th}$ MOS transistor M17, the 18$^{th}$ MOS transistor M18, the 19$^{th}$ MOS transistor M19, the 20$^{th}$ MOS transistor M20, the 21$^{st}$ MOS transistor M21, the 22$^{nd}$ MOS transistor M22, the 23$^{rd}$ MOS transistor M23, the 24$^{th}$ MOS transistor M24, the 25$^{th}$ MOS transistor M25 and the 26$^{th}$ MOS transistor M26; the 13$^{th}$ MOS transistor M13, the 14$^{th}$ MOS transistor M14, the 15$^{th}$ MOS transistor M15 and the 16$^{th}$ MOS transistor M16 belong to PMOS transistors; the 17$^{th}$ MOS transistor M17, the 18$^{th}$ MOS transistor M18, the 19$^{th}$ MOS transistor M19, the 20$^{th}$ MOS transistor M20, the 21$^{st}$ MOS transistor M21, the 22$^{nd}$ MOS transistor M22, the 23$^{rd}$ MOS transistor M23, the 24$^{th}$ MOS transistor M24, the 25$^{th}$ MOS transistor M25 and the 26$^{th}$ MOS transistor M26 belong to NMOS transistors; source of the 13$^{th}$ MOS transistor M13, source of the 14$^{th}$ MOS transistor M14, source of the 15$^{th}$ MOS transistor M15 and the source of the 16$^{th}$ MOS transistor M16 are connected to grid of the 19$^{th}$ MOS transistor M19, and the connecting terminal is connected to the power source VDD; grid of the 13$^{th}$ MOS transistor M13 and grid of the 16$^{th}$ MOS transistor M16 are connected to the grid of the 26$^{th}$ MOS transistor M26, and the connecting terminal is the clock terminal of the 1$^{st}$ three-input NOR/OR gate O1; drain of the 13$^{th}$ MOS transistor M13, drain of the 14$^{th}$ MOS transistor M14, grid of the 15$^{th}$ MOS transistor M15 and drain of the 17$^{th}$ MOS transistor M17 are connected to grid of the 18$^{th}$ MOS transistor M18, and the connecting terminal is the NOR logic output terminal of the 1$^{st}$ three-input NOR/OR gate O1; grid of the 14$^{th}$ MOS transistor M14, drain of the 15$^{th}$ MOS transistor M15, drain of the 16$^{th}$ MOS transistor M16 and grid of the 17$^{th}$ MOS transistor M17 are connected to drain of the 18$^{th}$ MOS transistor M18, and the connecting terminal is the OR logic output terminal of the 1$^{st}$ three-input NOR/OR gate O1; source of the 17$^{th}$ MOS transistor M17, drain of the 19$^{th}$ MOS transistor M19, drain of the 20$^{th}$ MOS transistor M20 and drain of the 21$^{st}$ MOS transistor M21 are connected to drain of the 22$^{nd}$ MOS transistor M22; source of the 18$^{th}$ MOS transistor M18 and source of the 19$^{th}$ MOS transistor M19 are connected to drain of the 23$^{rd}$ MOS transistor M23; source of the 20$^{th}$ MOS transistor M20 and source of the 23$^{rd}$ MOS transistor M23 are connected to drain of the 24$^{th}$ MOS transistor M24; source of the 21$^{st}$ MOS transistor M21 and source of the 24$^{th}$ MOS transistor M24 are connected to drain of the 25$^{th}$ MOS transistor M25; source of the 22$^{nd}$ MOS transistor M22 and source of the 25$^{th}$ MOS transistor M25 are connected to drain of the 26$^{th}$ MOS transistor M26; source of the 26$^{th}$ MOS transistor M26 is grounded; grid of the 20$^{th}$ MOS transistor M20 is the 1$^{st}$ input terminal of the 1$^{st}$ three-input NOR/OR gate O1; grid of the 21$^{st}$ MOS transistor M21 is the 2$^{nd}$ input terminal of the 1$^{st}$ three-input NOR/OR gate O1; grid of the 22$^{nd}$ MOS transistor M22 is the 3$^{rd}$ input terminal of the 1$^{st}$ three-input NOR/OR gate O1; grid of the 23$^{rd}$ MOS transistor M23 is the 1$^{st}$ inverting input terminal of the 1$^{st}$ three-input NOR/OR gate O1; grid of the 24$^{th}$ MOS transistor M24 is the 2$^{nd}$ inverting input terminal of the 1$^{st}$ three-input NOR/OR gate O1; grid of the 25$^{th}$ MOS transistor M25 is the 3$^{rd}$ inverting input terminal of the 1$^{st}$ three-input NOR/OR gate O1; circuit structure of the 2$^{nd}$ three-input NOR/OR gate O2, the 3$^{rd}$ three-input NOR/OR gate O3 and the 4$^{th}$ three-input NOR/OR gate O4 is identical to that of the 1$^{st}$ three-input NOR/OR gate O1.

Figure 4:
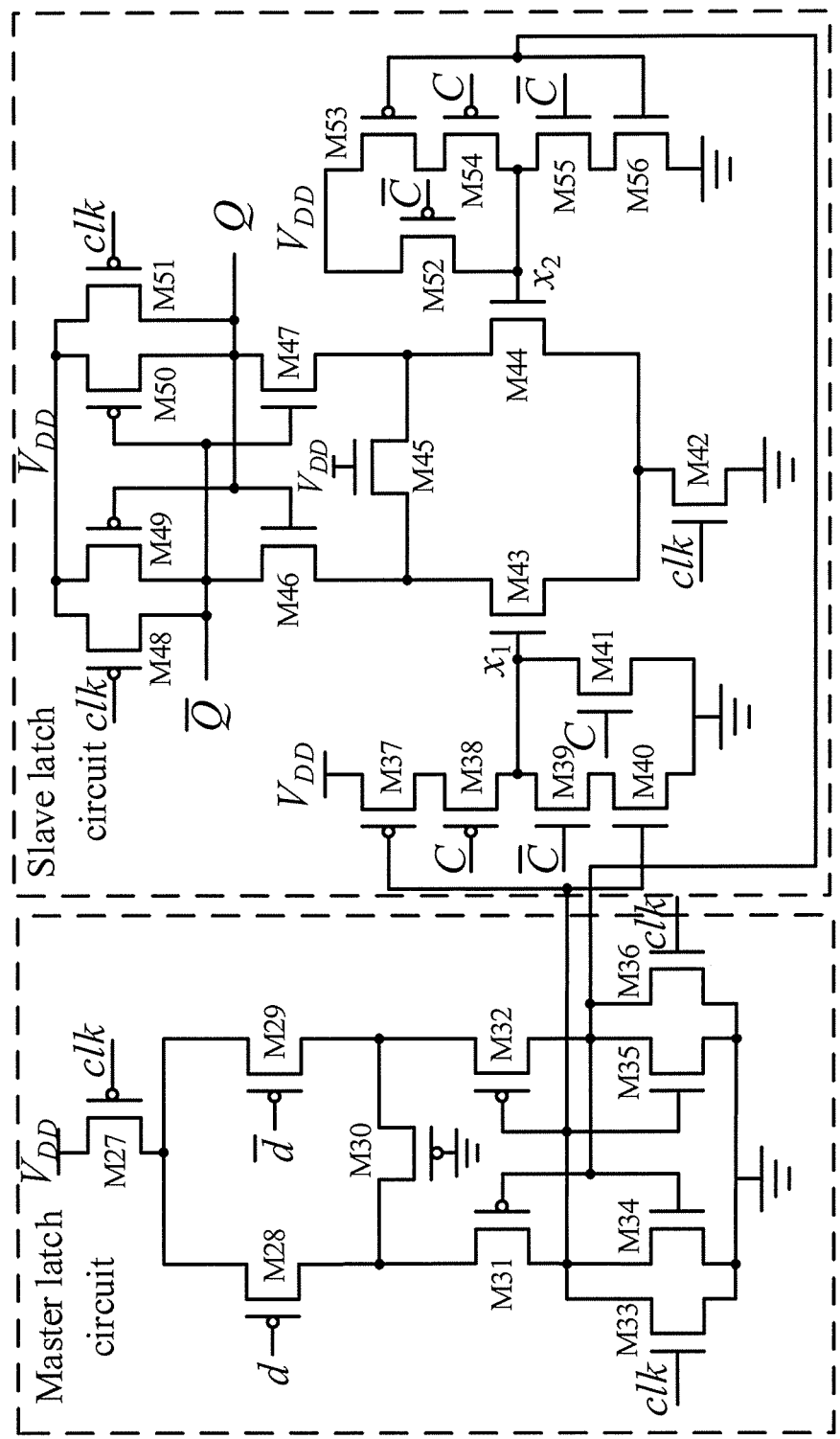
FIG. 4(a) is the circuit diagram for the 1$^{st}$ master-slave D flip-flop according to the present invention.
FIG. 4(b) is the graphical diagram for the 1$^{st}$ master-slave D flip-flop according to the present invention.
Figure 4:
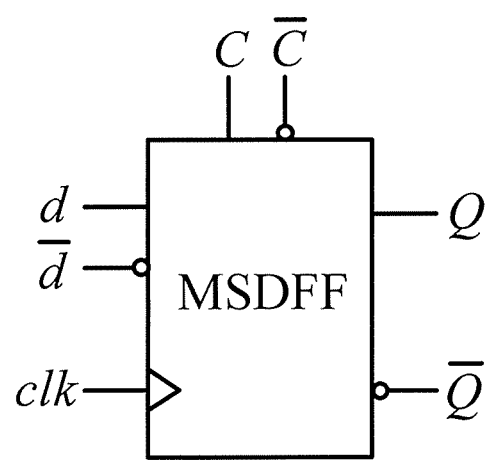

As shown in FIGS. 4(a) and 4(b), in this embodiment, the 1$^{st}$ master-slave D flip-flop U1 comprises the 27$^{th}$ MOS transistor M27, the 28$^{th}$ MOS transistor M28, the 29$^{th}$ MOS transistor M29, the 30$^{th}$ MOS transistor M30, the 31$^{st}$ MOS transistor M31, the 32$^{nd}$ MOS transistor M32, the 33$^{rd}$ MOS transistor M33, the 34$^{th}$ MOS transistor M34, the 35$^{th}$ MOS transistor M35, the 36$^{th}$ MOS transistor M36, the 37$^{th}$ MOS transistor M37, the 38$^{th}$ MOS transistor M38, the 39$^{th}$ MOS transistor M39, the 40$^{th}$ MOS transistor M40, the 41$^{st}$ MOS transistor M41, the 42$^{nd}$ MOS transistor M42, the 43$^{rd}$ MOS transistor M43, the 44$^{th}$ MOS transistor M44, the 45$^{th}$ MOS transistor M45, the 46$^{th}$ MOS transistor M46, the 47$^{th}$ MOS transistor M47, the 48$^{th}$ MOS transistor M48, the 49$^{th}$ MOS transistor M49, the 50$^{th}$ MOS transistor M50, the 51$^{st}$ MOS transistor M51, the 52$^{nd}$ MOS transistor M52, the 53$^{rd}$ MOS transistor M53, the 54$^{th}$ MOS transistor M54, the 55$^{th}$ MOS transistor M55 and the 56$^{th}$ MOS transistor M56; the 27$^{th}$ MOS transistor M27, the 28$^{th}$ MOS transistor M28, the 29$^{th}$ MOS transistor M29, the 30$^{th}$ MOS transistor M30, the 31$^{st}$ MOS transistor M31, the 32$^{nd}$ MOS transistor M32, the 37$^{th}$ MOS transistor M37, the 38$^{th}$ MOS transistor M38, the 48$^{th}$ MOS transistor M48, the 49$^{th}$ MOS transistor M49, the 50$^{th}$ MOS transistor M50, the 51$^{st}$ MOS transistor M51, the 52$^{nd}$ MOS transistor M52, the 53$^{rd}$ MOS transistor M53 and the 54$^{th}$ MOS transistor M54 belong to PMOS transistors; the 33$^{rd}$ MOS transistor M33, the 34$^{th}$ MOS transistor M34, the 35$^{th}$ MOS transistor M35, the 36$^{th}$ MOS transistor M36, the 39$^{th}$ MOS transistor M39, the 40$^{th}$ MOS transistor M40, the 41$^{st}$ MOS transistor M41, the 42$^{nd}$ MOS transistor M42, the 43$^{rd}$ MOS transistor M43, the 44$^{th}$ MOS transistor M44, the 45$^{th}$ MOS transistor M45, the 46$^{th}$ MOS transistor M46, the 47$^{th}$ MOS transistor M47, the 55$^{th}$ MOS transistor M55 and the 56$^{th}$ MOS transistor M56 belong to NMOS transistors; source of the 27$^{th}$ MOS transistor M27, source of the 37$^{th}$ MOS transistor M37, grid of the 45$^{th}$ MOS transistor M45, source of the 48$^{th}$ MOS transistor M48, source of the 49$^{th}$ MOS transistor M49, source of the 50$^{th}$ MOS transistor M50, source of the 51$^{st}$ MOS transistor M51 and source of the 52$^{nd}$ MOS transistor M52 are connected to source of the 53$^{rd}$ MOS transistor M53, and the connecting terminal is connected to the power source VDD; grid of the 27$^{th}$ MOS transistor M27, grid of the 33$^{rd}$ MOS transistor M33, grid of the 36$^{th}$ MOS transistor M36, grid of the 42$^{nd}$ MOS transistor M42 and grid of the 48th MOS transistor M48 are connected to grid of the 51st MOS transistor M51, and the connecting terminal is the clock terminal of the 1st master-slave D flip-flop U1; drain of the 27th MOS transistor M27 and source of the 28th MOS transistor M28 are connected to source of the 29th MOS transistor M29; grid of the 28th MOS transistor M28 is input terminal of the 1st master-slave D flip-flop U1; drain of the 28th MOS transistor M28 and drain of the 30th MOS transistor M30 are connected to source of the 31st MOS transistor M31; grid of the 29th MOS transistor M29 is inverting input terminal of the 1st master-slave D flip-flop U1; drain of the 29th MOS transistor M29 and source of the 30th MOS transistor M30 are connected to source of the 32nd MOS transistor M32; grid of the 30th MOS transistor M30 is grounded; drain of the 31st MOS transistor M31, grid of the 32nd MOS transistor M32, drain of the 33rd MOS transistor M33, drain of the 34th MOS transistor M34, grid of the 35th MOS transistor M35 and grid of the 37th MOS transistor M37 are connected to grid of the 40th MOS transistor M40; grid of the 31st MOS transistor M31, grid of the 34th MOS transistor M34, drain of the 32nd MOS transistor M32, drain of the 35th MOS transistor M35, drain of the 36th MOS transistor M36 and grid of the 53rd MOS transistor M53 are connected to grid of the 56th MOS transistor M56; source of the 33rd MOS transistor M33, source of the 34th MOS transistor M34, source of the 35th MOS transistor M35 and source of the 36th MOS transistor M36 are grounded; drain of the 37th MOS transistor M37 is connected to source of the 38th MOS transistor M38; grid of the 38th MOS transistor M38 and grid of the 41st MOS transistor M41 are connected to grid of the 54th MOS transistor M54, and the connecting terminal is the reset terminal of the 1st master-slave D flip-flop U1; drain of the 38th MOS transistor M38, drain of the 39th MOS transistor M39 and drain of the 41st MOS transistor M41 are connected to grid of the 43rd MOS transistor M43; grid of the 39th MOS transistor M39 and grid of the 52nd MOS transistor M52 are connected to grid of the 55th MOS transistor M55, and the connecting terminal is the inverting reset terminal of the 1st master-slave D flip-flop U1; source of the 39th MOS transistor M39 is connected to drain of the 40th MOS transistor M40; source of the 40th MOS transistor M40 and source of the 41st MOS transistor M41 are grounded; source of the 42nd MOS transistor M42 is grounded; drain of the 42nd MOS transistor M42 and source of the 43rd MOS transistor M43 are connected to source of the 44th MOS transistor M44; drain of the 43rd MOS transistor M43 and drain of the 45th MOS transistor M45 are connected to source of the 46th, MOS transistor M46; grid of the 44th MOS transistor M44, drain of the 52nd MOS transistor M52 and drain of the 54th MOS transistor M54 are connected to drain of the 55th MOS transistor M55; drain of the 44th MOS transistor M44 and source of the 45th MOS transistor M45 are connected to source of the 47th MOS transistor M47; grid of the 46th MOS transistor M46, grid of the 49th MOS transistor M49, drain of the 47th MOS transistor M47 and drain of the 50th MOS transistor M50 are connected to drain of the 51st MOS transistor M51, and the connecting terminal is output terminal of the 1st master-slave D flip-flop U1; drain of the 46th MOS transistor M46, drain of the 48th MOS transistor M48, drain of the 49th MOS transistor M49 and grid of the 47th MOS transistor M47 are connected to grid of the 50th MOS transistor M50, and the connecting terminal is inverting output terminal of the 1st master-slave D flip-flop U1; drain of the 53rd MOS transistor M53 is connected to source of the 54th MOS transistor M54; source of the 55th MOS transistor M55 is connected to drain of the 56th MOS transistor M56; source of the 56th MOS transistor M56 is grounded; circuit structure of the 2nd master-slave D flip-flop U2, 3rd master-slave D flip-flop U3 and 4th master-slave D flip-flop U4 is identical to that of the 1st master-slave D flip-flop U1.

Figure 5:
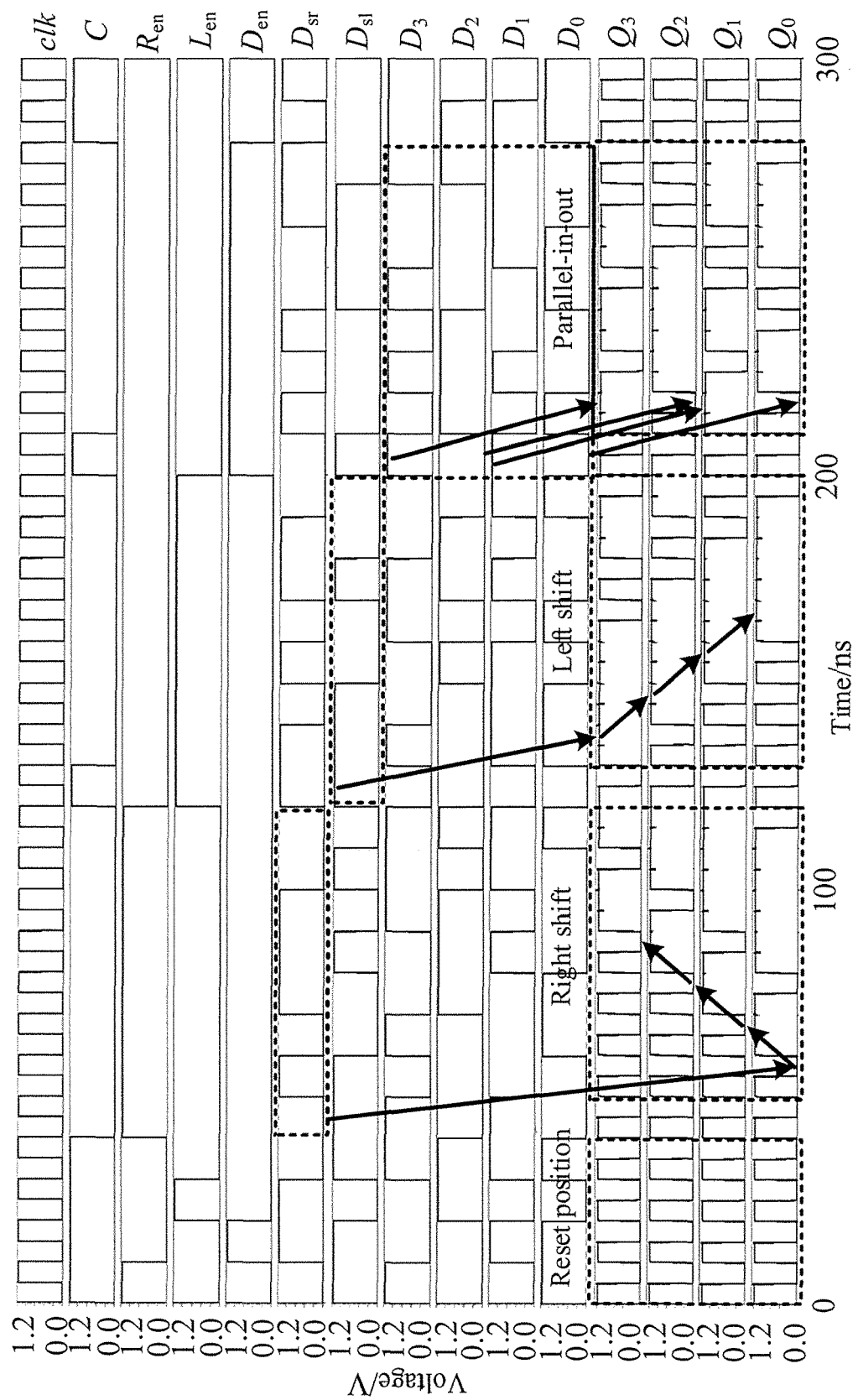
FIG. 5 shows the simulation waveform of the shift register capable of defending against DPA attack according to the present invention.

Spectre is used for computerized simulation of the shift register circuit in this embodiment based on parameters for TSMC 65 nm COMS technical elements; simulation waveform is as shown in FIG. 5; wherein, working frequency is 100 MHz, and the circuit output signal is postponed by one clock cycle as compared with input signal. Output terminals of the shift register are to be pre-charged to the high level once clock signal clk=0 is input from the clock terminal of the shift register according to the present invention; otherwise, the shift register at C=1 can realize reset function in case of clk=1; when other enabling signals are invalid in case of $R_{en}$=1, the shift register is to be provided with right shift function; when other enabling signals are invalid in case of $L_{en}$=1, the shift register is to be provided with left shift function; when other enabling signals are invalid in case of $D_{en}$=1, the shift register is to be provided with parallel-in-out function. According to analysis of simulation waveform as shown in FIG. 5, the shift register according to the present invention is provided with correct logic functions.

Figure 6:
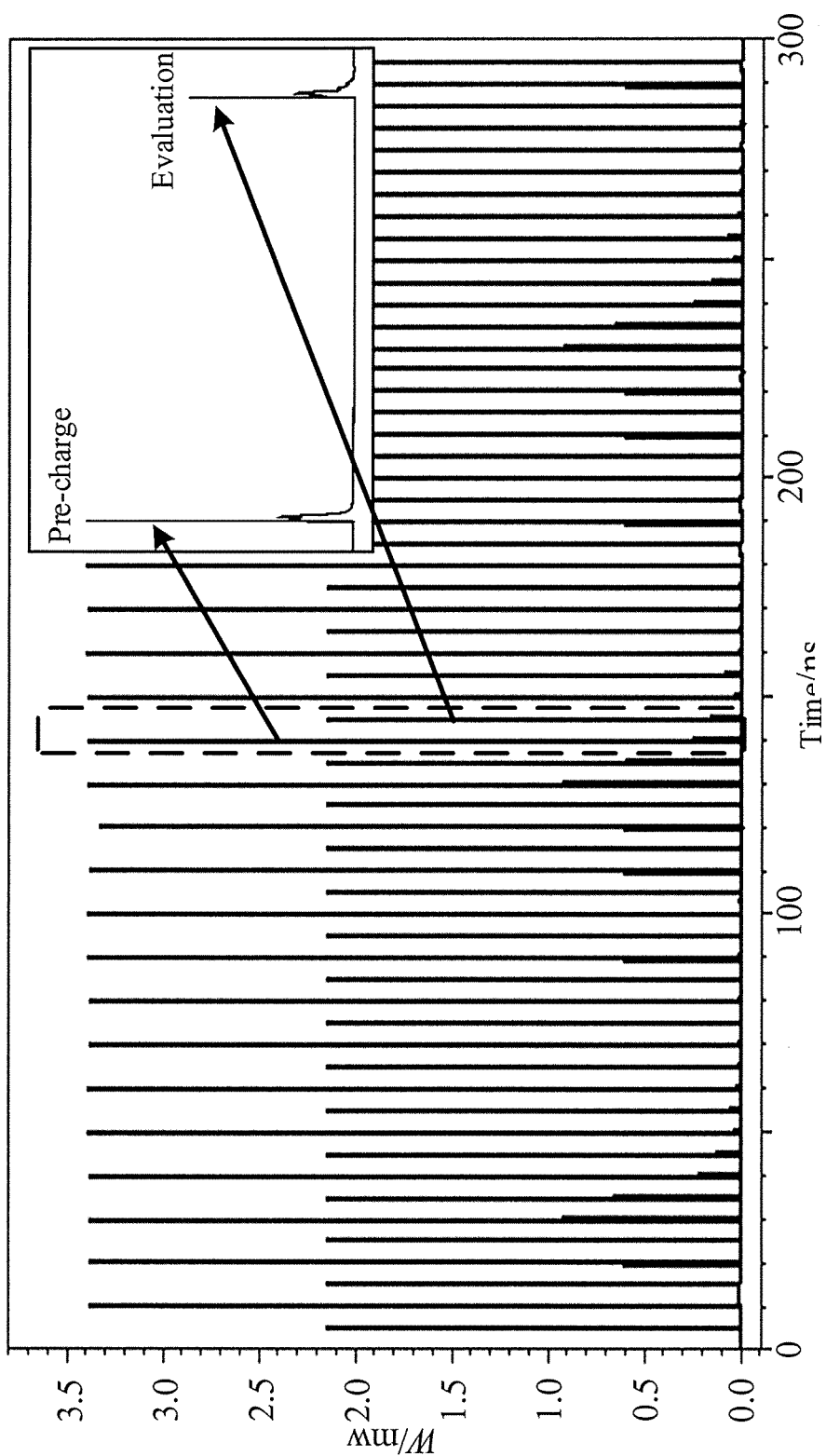
FIG. 6 is the curve chart for power consumption of the shift register capable of defending against DPA attack according to the present invention.

Deviation to power consumption in different clock cycles is used to manifest the performance of shift register in defending against DPA attack; waveform for Spectre power consumption simulation is as shown in FIG. 6. As indicated by FIG. 6, the shift register designed based on this thesis is provided with consistent power consumption curve in different clock cycles no matter it is executing left shift, right shift or parallel-in-out function; it has significant constant power consumption, which can effectively defend against DPA attack.

Figure 7:
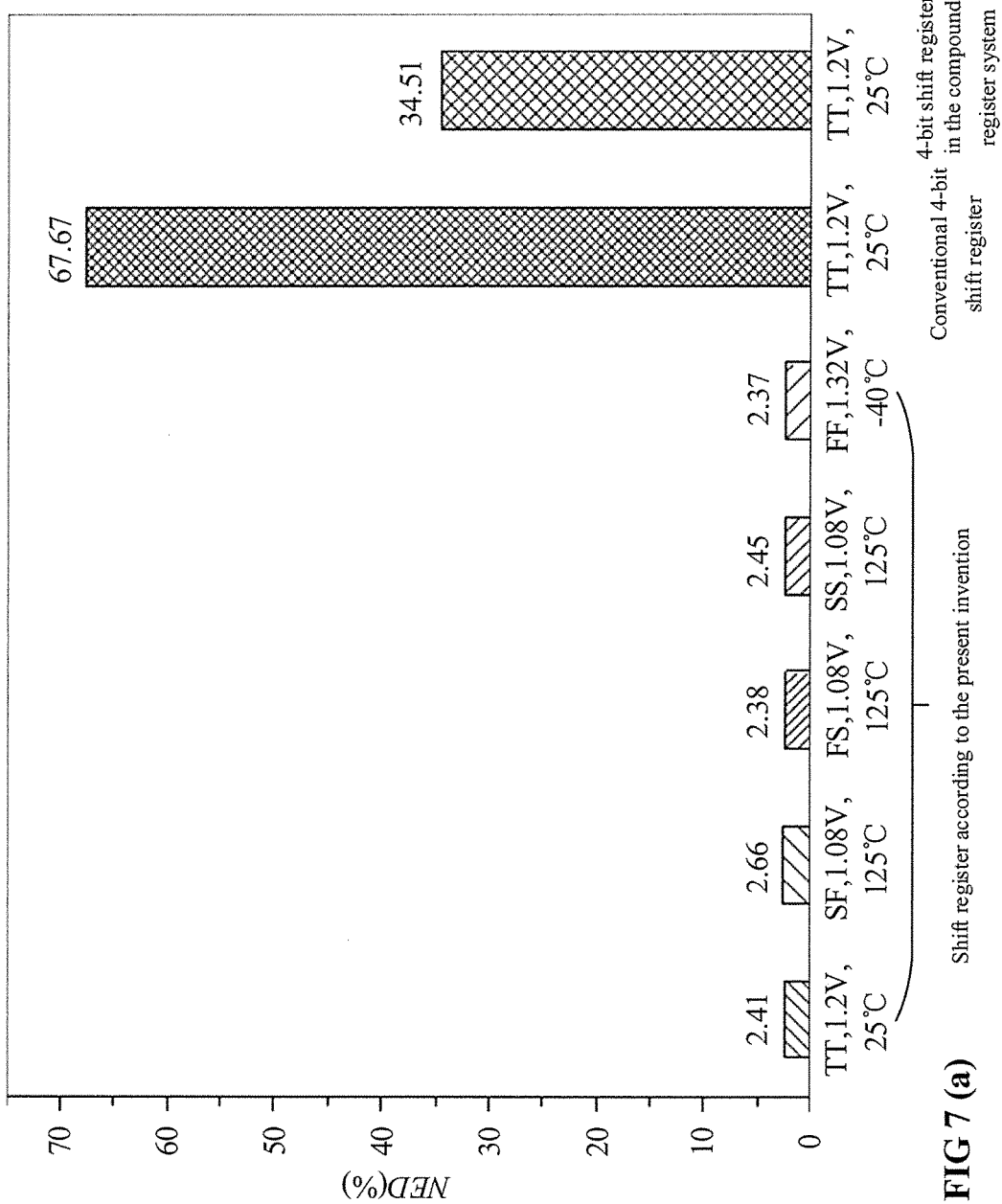
FIG. 7(a) is the comparison diagram for normalized power consumption deviation between the shift register according to the present invention and two existing shift registers.
FIG. 7(b) is the comparison diagram for normalized standard deviation between the shift register according to the present invention and two existing shift registers.
Figure 7:
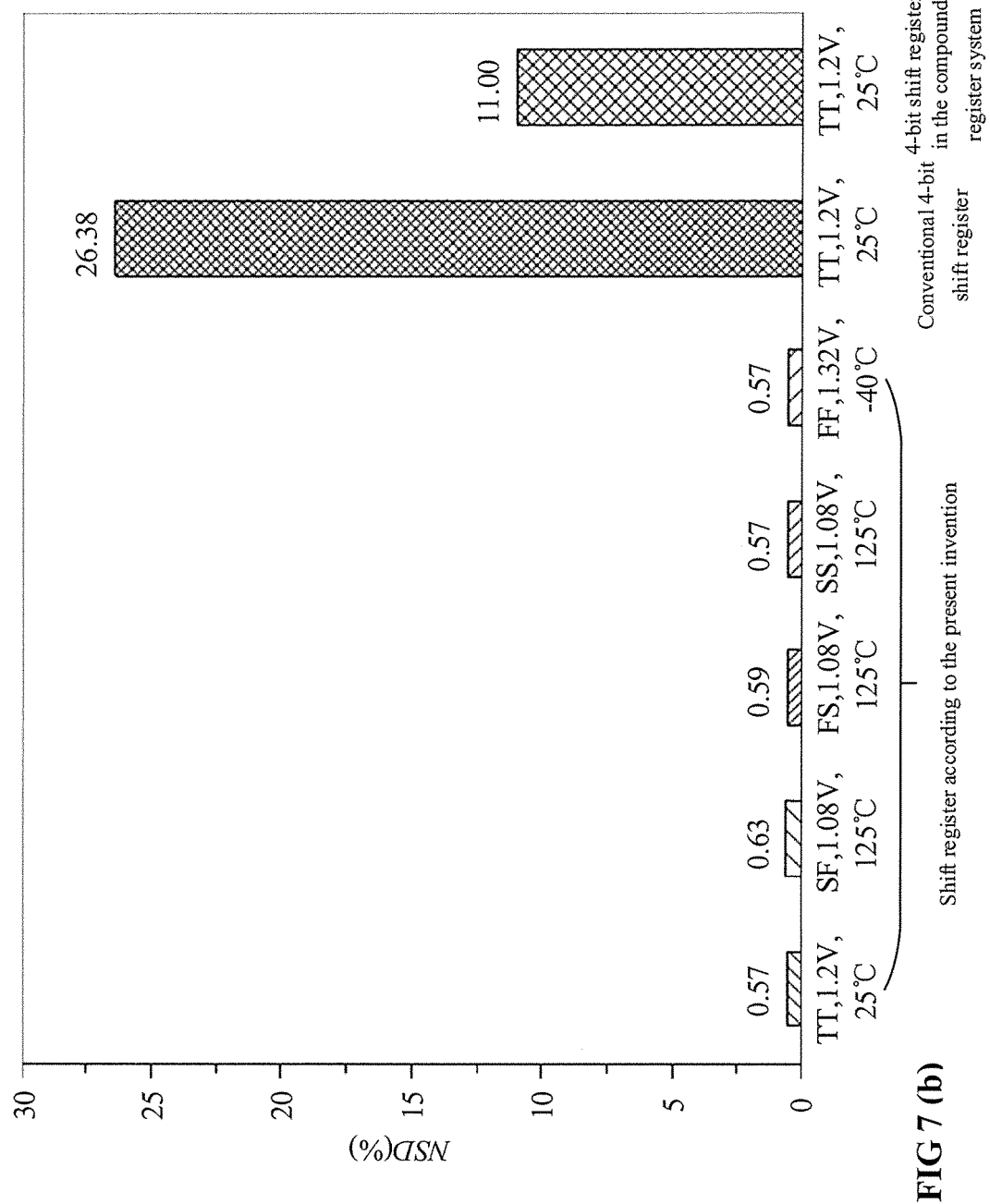

FIG. 7(a) is the comparison diagram for deviation to normalized power consumption of the shift register according to the present invention, the 4-bit shift register in the compound register system disclosed by the literature: "Liu Zeyi, Gao Neng, Tu Chenyang and etc., A Compound Register System Capable of Defending Against Energy Analysis Attack [J]. Journal of Cryptologic Research, 2014 (5):411-421." and the conventional 4-bit shift register disclosed in the literature: "Yan Shi. Digital Electronic Technology [M], Edition 5, Beijing: Higher Education Press, 2006"; FIG. 7(b) is the comparison diagram for normalized standard deviation to the shift register according to the present invention, the 4-bit shift register in the compound register system disclosed by the literature: "Liu Zeyi, Gao Neng, Tu Chenyang and etc., A Compound Register System Capable of Defending Against Energy Analysis Attack [J]. Journal of Cryptologic Research, 2014(5):411-421." and the conventional 4-bit shift register disclosed in the literature: "Yan Shi. Digital Electronic Technology [M], Edition 5, Beijing: Higher Education Press, 2006"; Wherein, PVT (Process, Voltage, Temperature) refers to process angle, voltage and temperature that might be confronted during circuit manufacture and operation. As indicated by data in FIG. 7(a) and FIG. 7(b), NED and NSD of the shift register circuit according to the present invention is below 2.66% and 0.63% respectively under different PVT combinations; its NED and NSD are reduced by 92.29% and 94.27% respectively as compared with the 4-bit shift register in the compound register system; this manifests that it has excellent performance in analysis of defense differential power consumption.

What is claim is:

1. A shift register capable of defending against Differential Power Analysis (DPA) attack, comprising: a $1^{st}$ master-slave D flip-flop, a $2^{nd}$ master-slave D flip-flop, a $3^{rd}$ master-slave D flip-flop, a $4^{th}$ master-slave D flip-flop, a $1^{st}$ two-input NAND/AND gate, a $2^{nd}$ two-input NAND/AND gate, a $3^{rd}$ two-input NAND/AND gate, a $4^{th}$ two-input NAND/AND gate, a $5^{th}$ two-input NAND/AND gate, a $6^{th}$ two-input NAND/AND gate, a $7^{th}$ two-input NAND/AND gate, an $8^{th}$ two-input NAND/AND gate, a $9^{th}$ two-input NAND/AND gate, a $10^{th}$ two-input NAND/AND gate, an $11^{th}$ two-input NAND/AND gate, a $12^{th}$ two-input NAND/AND gate, a $1^{st}$ three-input NOR/OR gate, a $2^{nd}$ three-input NOR/OR gate, a $3^{rd}$ three-input NOR/OR gate, a $4^{th}$ three-input NOR/OR gate, a $1^{st}$ inverter, a $2^{nd}$ inverter, a $3^{rd}$ inverter, a $4^{th}$ inverter, a $5^{th}$ inverter, a $6^{th}$ inverter, a $7^{th}$ inverter, an $8^{th}$ inverter, a $9^{th}$ inverter, a $10^{th}$ inverter, an $11^{th}$ inverter, a $12^{th}$ inverter, a $13^{th}$ inverter, a $14^{th}$ inverter, a $15^{th}$ inverter, a $16^{th}$ inverter, a $17^{th}$ inverter, an $18^{th}$ inverter, a $19^{th}$ inverter, a $20^{th}$ inverter, a $21^{st}$ inverter, a $22^{nd}$ inverter, a $23^{rd}$ inverter, a $24^{th}$ inverter, a $25^{th}$ inverter, a $26^{th}$ inverter, a $27^{th}$ inverter, a $28^{th}$ inverter, a $29^{th}$ inverter, a $30^{th}$ inverter, a $31^{st}$ inverter, a $32^{nd}$ inverter, a $33^{rd}$ inverter, a $34^{th}$ inverter, a $35^{th}$ inverter, a $36^{th}$ inverter, a $37^{th}$ inverter, a $38^{th}$ inverter, a $39^{th}$ inverter and a $40^{th}$ inverter;

wherein each of the $1^{st}$ inverter, the $2^{nd}$ inverter, the $3^{rd}$ inverter, the $4^{th}$ inverter, the $5^{th}$ inverter, the $6^{th}$ inverter, the $7^{th}$ inverter, the $8^{th}$ inverter, the $9^{th}$ inverter, the $10^{th}$ inverter, the $11^{th}$ inverter, the $12^{th}$ inverter, the $13^{th}$ inverter, the $14^{th}$ inverter, the $15^{th}$ inverter, the $16^{th}$ inverter, the $17^{th}$ inverter, the $18^{th}$ inverter, the $19^{th}$ inverter, the $20^{th}$ inverter, the $21^{st}$ inverter, the $22^{nd}$ inverter, the $23^{rd}$ inverter, the $24^{th}$ inverter, the $25^{th}$ inverter, the $26^{th}$ inverter, the $27^{th}$ inverter, the $28^{th}$ inverter, the $29^{th}$ inverter, the $30^{th}$ inverter, the $31^{st}$ inverter, the $32^{nd}$ inverter, the $33^{rd}$ inverter, the $34^{th}$ inverter, the $35^{th}$ inverter, the $36^{th}$ inverter, the $37^{th}$ inverter, the $38^{th}$ inverter, the $39^{th}$ inverter and the $40^{th}$ inverter is provided with an input terminal and an output terminal;

wherein each of the $1^{st}$ master-slave D flip-flop, the $2^{nd}$ master-slave D flip-flop, the $3^{rd}$ master-slave D flip-flop and the $4^{th}$ master-slave D flip-flop is provided with a clock terminal, an input terminal, an inverting input terminal, an inverting output terminal, a reset terminal and an inverting reset terminal;

wherein each of the $1^{st}$ two-input NAND/AND gate, the $2^{nd}$ two-input NAND/AND gate, the $3^{rd}$ two-input NAND/AND gate, the $4^{th}$ two-input NAND/AND gate, the $5^{th}$ two-input NAND/AND gate, the $6^{th}$ two-input NAND/AND gate, the $7^{th}$ two-input NAND/AND gate, the $8^{th}$ two-input NAND/AND gate, the $9^{th}$ two-input NAND/AND gate, the $10^{th}$ two-input NAND/AND gate, the $11^{th}$ two-input NAND/AND gate and the $12^{th}$ two-input NAND/AND gate is provided with a clock terminal, the $1^{st}$ input terminal, the $1^{st}$ inverting input terminal, the $2^{nd}$ input terminal, the $2^{nd}$ inverting input terminal, a NAND logic output terminal and a AND logic output terminal;

wherein each of the $1^{st}$ three-input NOR/OR gate, the $2^{nd}$ three-input NOR/OR gate, the $3^{rd}$ three-input NOR/OR gate and the $4^{th}$ three-input NOR/OR gate is provided with a clock terminal, the $1^{st}$ input terminal, the $1^{st}$ inverting input terminal, the $2^{nd}$ input terminal, the $2^{nd}$ inverting input terminal, the $3^{rd}$ input terminal, the $3^{rd}$ inverting input terminal, a NOR logic output terminal and an OR logic output terminal;

wherein the clock terminal of the $1^{st}$ two-input NAND/AND gate, the clock terminal of the $2^{nd}$ two-input NAND/AND gate, the clock terminal of the $3^{rd}$ two-input NAND/AND gate, the clock terminal of the $4^{th}$ two-input NAND/AND gate, the clock terminal of the $5^{th}$ two-input NAND/AND gate, the clock terminal of the $6^{th}$ two-input NAND/AND gate, the clock terminal of the $7^{th}$ two-input NAND/AND gate, the clock terminal of the $8^{th}$ two-input NAND/AND gate, the clock terminal of the $9^{th}$ two-input NAND/AND gate, the clock terminal of the $10^{th}$ two-input NAND/AND gate, the clock terminal of the $11^{th}$ two-input NAND/AND gate, the clock terminal of the $12^{th}$ two-input NAND/AND gate, the clock terminal of the $1^{st}$ three-input NOR/OR gate, the clock terminal of the $2^{nd}$ three-input NOR/OR gate, the clock terminal of the $3^{rd}$ three-input NOR/OR gate, the clock terminal of the $4^{th}$ three-input NOR/OR gate, the clock terminal of the $1^{st}$ master-slave D flip-flop, the clock terminal of the $2^{nd}$ master-slave D flip-flop and the clock terminal of the $3^{rd}$ master-slave D flip-flop are connected to the clock terminal of the $4^{th}$ master-slave D flip-flop which forms a $1^{st}$ connecting terminal, and the $1^{st}$ connecting terminal is a clock terminal of the said shift register;

wherein the $1^{st}$ input terminal of the $1^{st}$ two-input NAND/AND gate is a right shift signal input terminal of the said shift register, which is coupled to a right shift input signal;

wherein the $1^{st}$ inverting input terminal of the $1^{st}$ two-input NAND/AND gate is an inverting right shift signal input terminal of the said shift register, which is coupled to an inverting right shift input signal;

wherein the $2^{nd}$ input terminal of the $1^{st}$ two-input NAND/AND gate, the $2^{nd}$ input terminal of the $4^{th}$ two-input NAND/AND gate and the $2^{nd}$ input terminal of the $7^{th}$ two-input NAND/AND gate are connected to the $2^{nd}$ input terminal of the $10^{th}$ two-input NAND/AND gate which forms a $2^{nd}$ connecting terminal, and the $2^{nd}$ connecting terminal is a right shift enabling signal input terminal of the said shift register, which is coupled to a right shift enabling signal;

wherein the $2^{nd}$ inverting input terminal of the $1^{st}$ two-input NAND/AND gate, the $2^{nd}$ inverting input terminal of the $4^{th}$ two-input NAND/AND gate and the $2^{nd}$ inverting input terminal of the $7^{th}$ two-input NAND/AND gate are connected to the $2^{nd}$ inverting input terminal of the $10^{th}$ two-input NAND/AND gate which forms a $3^{rd}$ connecting terminal, and the $3^{rd}$ connecting terminal is an inverting right shift enabling signal input terminal of the said shift register, which is coupled to an inverting right shift enabling signal;

wherein the $1^{st}$ input terminal of the $2^{nd}$ two-input NAND/AND gate, the $1^{st}$ input terminal of the $5^{th}$ two-input NAND/AND gate and the $1^{st}$ input terminal of the $8^{th}$ two-input NAND/AND gate are connected to the $1^{st}$ input terminal of the $11^{th}$ two-input NAND/AND gate which forms a $4^{th}$ connecting terminal, and the $4^{th}$ connecting terminal is a parallel-in-out enabling signal input terminal of the said shift register, which is coupled to a parallel-in-out enabling signal;

wherein the $1^{st}$ inverting input terminal of the $2^{nd}$ two-input NAND/AND gate, the $1^{st}$ inverting input terminal of the $5^{th}$ two-input NAND/AND gate and the $1^{st}$ inverting input terminal of the $8^{th}$ two-input NAND/AND gate are connected to the $1^{st}$ inverting input terminal of the $11^{th}$ two-input NAND/AND gate which forms a $5^{th}$ connecting terminal, and the $5^{th}$ connecting terminal is an inverting parallel-in-out enabling signal input terminal of the said shift register, which is coupled to an inverting parallel-in-out enabling signal;

wherein the $2^{nd}$ input terminal of the $2^{nd}$ two-input NAND/AND gate is the $1^{st}$ input terminal of the said shift register, which is coupled to a $1^{st}$ bit signal of a 4-bit parallel input signal;

wherein the $2^{nd}$ inverting input terminal of the $2^{nd}$ two-input NAND/AND gate is the $1^{st}$ inverting input terminal of the said shift register, which is coupled to a $1^{st}$ bit signal of a 4-bit inverting parallel input signal;

wherein the $2^{nd}$ input terminal of the $5^{th}$ two-input NAND/AND gate is the $2^{nd}$ input terminal of the said shift register, which is coupled to a $2^{nd}$ bit signal of the 4-bit parallel input signal;

wherein the $2^{nd}$ inverting input terminal of the $5^{th}$ two-input NAND/AND gate is the $2^{nd}$ inverting input terminal of the said shift register, which is coupled to a $2^{nd}$ bit signal of the 4-bit inverting parallel input signal;

wherein the $2^{nd}$ input terminal of the $8^{th}$ two-input NAND/AND gate is the $3^{rd}$ input terminal of the said shift register, which is coupled to receive a $3^{rd}$ bit signal of the 4-bit parallel input signal;

wherein the $2^{nd}$ inverting input terminal of the $8^{th}$ two-input NAND/AND gate is the $3^{rd}$ inverting input terminal of the said shift register, which is coupled to a $3^{rd}$ bit signal of the 4-bit inverting parallel input signal;

wherein the $2^{nd}$ input terminal of the $11^{th}$ two-input NAND/AND gate is the $4^{th}$ input terminal of the said shift register, which is coupled to a $4^{th}$ bit signal of the 4-bit parallel input signal;

wherein the $2^{nd}$ inverting input terminal of the $11^{th}$ two-input NAND/AND gate is the $4^{th}$ inverting input terminal of the said shift register, which is coupled to a $4^{th}$ bit signal of the 4-bit inverting parallel input signal;

wherein the $1^{st}$ input terminal of the $3^{rd}$ two-input NAND/AND gate, the $1^{st}$ input terminal of the $6^{th}$ two-input NAND/AND gate and the $1^{st}$ input terminal of the $9^{th}$ two-input NAND/AND gate are connected to the $1^{st}$ input terminal of the $12^{th}$ two-input NAND/AND gate which forms a $6^{th}$ connecting terminal, and the $6^{th}$ connecting terminal is a left shift enabling signal input terminal of the said shift register, which is coupled to a left shift enabling signal;

wherein the $1^{st}$ inverting input signal of the $3^{rd}$ two-input NAND/AND gate, the $1^{st}$ inverting input signal of the $6^{th}$ two-input NAND/AND gate and the $1^{st}$ inverting input terminal of the $9^{th}$ two-input NAND/AND gate are connected to the $1^{st}$ inverting input terminal of the $12^{th}$ two-input NAND/AND gate which forms a $7^{th}$ connecting terminal, and the $7^{th}$ connecting terminal is an inverting left shift enabling signal input terminal of the said shift register, which is coupled to an inverting left shift enabling signal;

wherein the $2^{nd}$ input terminal of the $3^{rd}$ two-input NAND/AND gate and the $1^{st}$ input terminal of the $7^{th}$ two-input NAND/AND gate are connected to the output terminal of the $35^{th}$ inverter;

wherein the $2^{nd}$ inverting input terminal of the $3^{rd}$ two-input NAND/AND gate and the $1^{st}$ inverting input terminal of the $7^{th}$ two-input NAND/AND gate are connected to the output terminal of the $36^{th}$ inverter;

wherein the $1^{st}$ input terminal of the $4^{th}$ two-input NAND/AND gate is connected to the output terminal of the $33^{rd}$ inverter;

wherein the $1^{st}$ inverting input terminal of the $4^{th}$ two-input NAND/AND is connected to the output terminal of the $34^{th}$ inverter;

wherein the $2^{nd}$ input terminal of the $6^{th}$ two-input NAND/AND gate and the $1^{st}$ input terminal of the $10^{th}$ two-input NAND/AND gate are connected to the output terminal of the $37^{th}$ inverter;

wherein the $2^{nd}$ inverting input terminal of the $6^{th}$ two-input NAND/AND gate and the $1^{st}$ inverting input terminal of the $10^{th}$ two-input NAND/AND gate are connected to the output terminal of the $38^{th}$ inverter;

wherein the $2^{nd}$ input terminal of the $9^{th}$ two-input NAND/AND gate is connected to the output terminal of the $39^{th}$ inverter;

wherein the $2^{nd}$ inverting input terminal of the $9^{th}$ two-input NAND/AND gate is connected to the output terminal of the $40^{th}$ inverter;

wherein the $2^{nd}$ input terminal of the $12^{th}$ two-input NAND/AND gate is a left shift signal input terminal of the said shift register, which is coupled to a left shift input signal;

wherein the $2^{nd}$ inverting input terminal of the $12^{th}$ two-input NAND/AND gate is an inverting left shift signal input terminal of the said shift register, which is coupled to an inverting left shift input signal;

wherein the AND logic output terminal of the $1^{st}$ two-input NAND/AND gate is connected to the input terminal of the $1^{st}$ inverter;

wherein the output terminal of the $1^{st}$ inverter is connected to the $1^{st}$ inverting input terminal of the $1^{st}$ three-input NOR/OR gate;

wherein the NAND logic output terminal of the $1^{st}$ two-input NAND/AND gate is connected to input terminal of the $2^{nd}$ inverter;

wherein the output terminal of the $2^{nd}$ inverter is connected to the $1^{st}$ input terminal of the $1^{st}$ three-input NOR/OR gate;

wherein the AND logic output terminal of the $2^{nd}$ two-input NAND/AND gate is connected to the input terminal of the $3^{rd}$ inverter;

wherein the output terminal of the $3^{rd}$ inverter is connected to the $2^{nd}$ inverting input terminal of the $1^{st}$ three-input NOR/OR gate;

wherein the NAND logic output terminal of the $2^{nd}$ two-input NAND/AND gate is connected to the input terminal of the $4^{th}$ inverter;

wherein the output terminal of the $4^{th}$ inverter is connected to the $2^{nd}$ input terminal of the $1^{st}$ three-input NOR/OR gate;

wherein the AND logic output terminal of the $3^{rd}$ two-input NAND/AND gate is connected to the input terminal of the $5^{th}$ inverter;

wherein the output terminal of the $5^{th}$ inverter is connected to the $3^{rd}$ inverting input terminal of the $1^{st}$ three-input NOR/OR gate;

wherein the NAND logic output terminal of the $3^{rd}$ two-input NAND/AND gate is connected to the input terminal of the $6^{th}$ inverter;

wherein the output terminal of the $6^{th}$ inverter is connected to the $3^{rd}$ input terminal of the $1^{st}$ three-input NOR/OR gate;

wherein the AND logic output terminal of the $4^{th}$ two-input NOR/OR gate is connected to the input terminal of the $7^{th}$ inverter;

wherein the output terminal of the $7^{th}$ inverter is connected to the $1^{st}$ inverting input terminal of the $2^{nd}$ three-input NAND/AND inverting input terminal;

wherein the NAND logic output terminal of the 4$^{th}$ two-input NAND/AND gate is connected to the input terminal of the 8$^{th}$ inverter;

wherein the output terminal of the 8$^{th}$ inverter is connected to the 1$^{st}$ input terminal of the 2$^{nd}$ three-input NOR/OR gate;

wherein the AND logic output terminal of the 5$^{th}$ two-input NAND/AND gate is connected to the input terminal of the 9$^{th}$ inverter;

wherein the output terminal of the 9$^{th}$ inverter is connected to the 2$^{nd}$ inverting input terminal of the 2$^{nd}$ three-input NOR/OR gate;

wherein the NAND logic output terminal of the 5$^{th}$ two-input NAND/AND gate is connected to the input terminal of the 10$^{th}$ inverter;

wherein the output terminal of the 10$^{th}$ inverter is connected to the 2$^{nd}$ input terminal of the 2$^{nd}$ three-input NOR/OR gate;

wherein the AND logic output terminal of the 6$^{th}$ two-input NAND/AND gate is connected to the input terminal of the 11$^{th}$ inverter;

wherein the output terminal of the 11$^{th}$ inverter is connected to the 3$^{rd}$ inverting input terminal of the 2$^{nd}$ three-input NOR/OR gate;

wherein the NAND logic output terminal of the 6$^{th}$ two-input NAND/AND gate is connected to the input terminal of the 12$^{th}$ inverter;

wherein the output terminal of the 12$^{th}$ inverter is connected to the 3$^{rd}$ input terminal of the 2$^{nd}$ three-input NAND/AND gate;

wherein the AND logic output terminal of the 7$^{th}$ two-input NAND/AND gate is connected to the input terminal of the 13$^{th}$ inverter;

wherein the output terminal of the 13$^{th}$ inverter is connected to the 1$^{st}$ inverting input terminal of the 3$^{rd}$ three-input NOR/OR gate;

wherein the NAND logic output terminal of the 7$^{th}$ two-input NAND/AND gate is connected to the input terminal of the 14$^{th}$ inverter;

wherein the output terminal of the 14$^{th}$ inverter is connected to the 1$^{st}$ input terminal of the 3$^{rd}$ three-input NOR/OR gate;

wherein the AND logic output terminal of the 8$^{th}$ two-input NAND/AND gate is connected to the input terminal of the 15$^{th}$ inverter;

wherein the output terminal of the 15$^{th}$ inverter is connected to the 2$^{nd}$ inverting input terminal of the 3$^{rd}$ three-input NOR/OR gate;

wherein the NAND logic output terminal of the 8$^{th}$ two-input NAND/AND gate is connected to the input terminal of the 16$^{th}$ inverter;

wherein the output terminal of the 16$^{th}$ inverter is connected to the 2$^{nd}$ input terminal of the 3$^{rd}$ three-input NAND/AND gate;

wherein the AND logic output terminal of the 9$^{th}$ two-input NAND/AND gate is connected to the input terminal of the 17$^{th}$ inverter;

wherein the output terminal of the 17$^{th}$ inverter is connected to the 3$^{rd}$ inverting input terminal of the 3$^{rd}$ three-input NOR/OR gate;

wherein the NAND logic output terminal of the 9$^{th}$ two-input NAND/AND gate is connected to the input terminal of the 18$^{th}$ inverter;

wherein the output terminal of the 18$^{th}$ inverter is connected to the 3$^{rd}$ input terminal of the 3$^{rd}$ three-input NOR/OR gate;

wherein the AND logic output terminal of the 10$^{th}$ two-input NAND/AND gate is connected to the input terminal of the 19$^{th}$ inverter;

wherein the output terminal of the 19$^{th}$ inverter is connected to the 1$^{st}$ inverting input terminal of the 4$^{th}$ three-input NOR/OR gate;

wherein the NAND logic output terminal of the 10$^{th}$ two-input NAND/AND gate is connected to the input terminal of the 20$^{th}$ inverter;

wherein the output terminal of the 20$^{th}$ inverter is connected to the 1$^{st}$ input terminal of the 4$^{th}$ three-input NOR/OR gate;

wherein the AND logic output terminal of the 11$^{th}$ two-input NAND/AND gate is connected to the input terminal of the 21$^{st}$ inverter;

wherein the output terminal of the 21$^{st}$ inverter is connected to the 2$^{nd}$ inverting input terminal of the 4$^{th}$ three-input NOR/OR gate;

wherein the NAND logic output terminal of the 11$^{th}$ two-input NAND/AND gate is connected to the input terminal of the 22$^{nd}$ inverter;

wherein the output terminal of the 22$^{nd}$ inverter is connected to the 2$^{nd}$ input terminal of the 4$^{th}$ three-input NAND/AND gate;

wherein the AND logic output terminal of the 12$^{th}$ two-input NAND/AND gate is connected to the input terminal of the 23$^{rd}$ inverter;

wherein the output terminal of the 23$^{rd}$ inverter is connected to the 3$^{rd}$ inverting input terminal of the 4$^{th}$ three-input NAND/AND gate;

wherein the NAND logic output terminal of the 12$^{th}$ two-input NAND/AND gate is connected to the input terminal of the 24$^{th}$ inverter;

wherein the output terminal of the 25$^{th}$ inverter is connected to the inverting input terminal of the 1$^{st}$ master-slave D flip-flop;

wherein the NOR logic output terminal of the 1$^{st}$ three-input NOR/OR gate is connected to the input terminal of the 26$^{th}$ inverter;

wherein the output terminal of the 26$^{th}$ inverter is connected to the input terminal of the 1$^{st}$ master-slave D flip-flop;

wherein the OR logic output terminal of the 2$^{nd}$ three-input NOR/OR gate is connected to the input terminal of the 27$^{th}$ inverter;

wherein the output terminal of the 27$^{th}$ inverter is connected to the inverting input terminal of the 2$^{nd}$ master-slave D flip-flop;

wherein the NOR logic output terminal of the 2$^{nd}$ three-input NOR/OR gate is connected to the input terminal of the 28$^{th}$ inverter;

wherein the output terminal of the 28$^{th}$ inverter is connected to the input terminal of the 2$^{nd}$ master-slave D flip-flop;

wherein the OR logic output terminal of the 3$^{rd}$ three-input NOR/OR gate is connected to the input terminal of the 29$^{th}$ inverter;

wherein the output terminal of the 29$^{th}$ inverter is connected to the inverting input terminal of the 3$^{rd}$ master-slave D flip-flop;

wherein the NOR logic output terminal of the 3$^{rd}$ three-input NOR/OR gate is connected to the input terminal of the 30$^{th}$ inverter;

wherein the output terminal of the 30$^{th}$ inverter is connected to the input terminal of the 3$^{rd}$ master-slave D flip-flop;

wherein the OR logic output terminal of the 4th three-input NOR/OR gate is connected to the input terminal of the 31st inverter;

wherein the output terminal of the 31st inverter is connected to the inverting input terminal of the 4th master-slave D flip-flop;

wherein the NOR logic output terminal of the 4th three-input NOR/OR gate is connected to the 32nd inverter;

wherein the output terminal of the 32nd inverter is connected to the input terminal of the 4th master-slave D flip-flop;

wherein the reset terminal of the 1st master-slave D flip-flop, the reset terminal of the 2nd master-slave D flip-flop and the reset terminal of the 3rd master-slave D flip-flop are connected to the reset terminal of the 4th master-slave D flip-flop which forms an 8th connecting terminal, and the 8th connecting terminal is the reset terminal of the said shift register, which is coupled to a reset signal;

wherein the inverting reset terminal of the 1st master-slave D flip-flop, the inverting reset terminal of the 2nd master-slave D flip-flop and the inverting reset terminal of the 3rd master-slave D flip-flop are connected to the inverting reset terminal of the 4th master-slave D flip-flop which forms a 9th connecting terminal, and the 9th connecting terminal is the inverting reset terminal of the said shift register, which is coupled to an inverting reset signal;

wherein the input terminal of the 33rd inverter is connected to the inverting output terminal of the 1st master-slave D flip-flop which forms a 10th connecting terminal, and the 10th connecting terminal is the 1st inverting output terminal of the said shift register, which is configured to output a 1st bit inverting output signal;

wherein the input terminal of the 34th inverter is connected to the output terminal of the 1st master-slave D flip-flop which forms an 11th connecting terminal, and the 11th connecting terminal is the 1st output terminal of the said shift register, which is configured to output a 1st bit output signal;

wherein the input terminal of the 35th inverter is connected to inverting output terminal of the 2nd master-slave D flip-flop which forms a 12th connecting terminal, and the 12th connecting terminal is the 2nd inverting output terminal of the said shift register, which is configured to output a 2nd bit inverting output signal;

wherein the input terminal of the 36th inverter is connected to the output terminal of the 2nd master-slave D flip-flop which forms a 13th connecting terminal, and the 13th connecting terminal is the 2nd output terminal of the said shift register, which is configured to output a 2nd bit output signal;

wherein the input terminal of the 37th inverter is connected to the inverting output terminal of the 3rd master-slave D flip-flop which forms a 14th connecting terminal, and the 14th connecting terminal is the 3rd inverting output terminal of the said shift register, which is configured to output a 3rd bit inverting output signal;

wherein the input terminal of the 38th inverter is connected to the output terminal of the 3rd master-slave D flip-flop which forms a 15th connecting terminal, and the 15th connecting terminal is the 3rd output terminal of the said shift register, which is configured to output a 3rd bit output signal;

wherein the input terminal of the 39th inverter is connected to the inverting output terminal of the 4th master-slave D flip-flop which forms a 16th connecting terminal, and the 16th connecting terminal is the 4th inverting output terminal of the said shift register, which is configured to output a 4th bit inverting output signal;

wherein the input terminal of the 40th inverter is connected to the output terminal of the 4th master-slave D flip-flop which forms a 17th connecting terminal, and the 17th connecting terminal is the 4th output terminal of the said shift register, which is configured to output a 4th bit output signal.

2. The shift register capable of defending against DPA attack according to claim 1, wherein the 1st two-input NAND/AND gate comprises a 1st MOS transistor, a 2nd MOS transistor, a 3rd MOS transistor, a 4th MOS transistor, a 5th MOS transistor, a 6th MOS transistor, a 7th MOS transistor, an 8th MOS transistor, a 9th MOS transistor, a 10th MOS transistor, an 11th MOS transistor and a 12th MOS transistor;

wherein the 1st MOS transistor, the 2nd MOS transistor, the 3rd MOS transistor and the 4th MOS transistor are PMOS transistors; and the 5th MOS transistor, the 6th MOS transistor, the 7th MOS transistor, the 8th MOS transistor, the 9th MOS transistor, the 10th MOS transistor, the 11th MOS transistor and the 12th MOS transistor are NMOS transistors;

wherein a source of the 1st MOS transistor, a source of the 2nd MOS transistor, a source of the 3rd MOS transistor and a source of the 4th MOS transistor are connected to a grid of the 7th MOS transistor which forms an 18th connecting terminal, and the 18th connecting terminal is connected to a power source;

wherein a grid of the 1st MOS transistor and a grid of the 4th MOS transistor are connected to a grid of the 12th MOS transistor which forms a 19th connecting terminal, and the 19th connecting terminal is the clock terminal of the 1st two-input NAND/AND gate;

wherein a drain of the 1st MOS transistor, a drain of the 2nd MOS transistor, a grid of the 3rd MOS transistor and a drain of the 5th MOS transistor are connected to a grid of the 6th MOS transistor which forms a 20th connecting terminal, and the 20th connecting terminal is the NAND logic output terminal of the 1st two-input NAND/AND gate;

wherein a grid of the 2nd MOS transistor, a drain of the 3rd MOS transistor, a drain of the 4th MOS transistor and a grid of the 5th MOS transistor are connected to a drain of the 6th MOS transistor which forms a 21st connecting terminal, and the 21st connecting terminal is the NAND/AND logic output terminal of the 1st two-input NAND/AND gate;

wherein a source of the 5th MOS transistor and a drain of the 7th MOS transistor are connected to a drain of the 8th MOS transistor;

wherein a source of the 6th MOS transistor, a source of the 7th MOS transistor and a drain of the 9th MOS transistor are connected to a drain of the 11th MOS transistor;

wherein a grid of the 8th MOS transistor is the 1st input terminal of the 1st two-input NAND/AND gate;

wherein a grid of the 9th MOS transistor is the 1st inverting input terminal of the 1st two-input NAND/AND gate;

wherein a grid of the 10th MOS transistor is the 2nd input terminal of the 1st two-input NAND/AND gate;

wherein a grid of the 11th MOS transistor is the 2nd inverting input terminal of the 1st two-input NAND/AND gate;

wherein a source of the 8$^{th}$ MOS transistor and a source of the 9$^{th}$ MOS transistor are connected to a drain of the 10$^{th}$ MOS transistor;

wherein a source of the 10$^{th}$ MOS transistor and a source of the 11$^{th}$ MOS transistor are connected to a drain of the 12$^{th}$ MOS transistor;

wherein a source of the 12$^{th}$ MOS transistor is grounded;

wherein circuit structure of the 2$^{nd}$ two-input NAND/AND gate, the 3$^{rd}$ two-input NAND/AND gate, the 4$^{th}$ two-input NAND/AND gate, the 5$^{th}$ two-input NAND/AND gate, the 6$^{th}$ two-input NAND/AND gate, the 7$^{th}$ two-input NAND/AND gate, the 8$^{th}$ two-input NAND/AND gate, the 9$^{th}$ two-input NAND/AND gate, the 10$^{th}$ two-input NAND/AND gate, the 11$^{th}$ two-input NAND/AND gate and the 12$^{th}$ two-input NAND/AND gate are identical to the circuit structure of the 1$^{st}$ two-input NAND/AND gate.

3. The shift register capable of defending against DPA attack according to claim 1, wherein the 1$^{st}$ three-input NOR/OR gate comprises a 13$^{th}$ MOS transistor, a 14$^{th}$ MOS transistor, a 15$^{th}$ MOS transistor, a 16$^{th}$ MOS transistor, a 17$^{th}$ MOS transistor, an 18$^{th}$ MOS transistor, a 19$^{th}$ MOS transistor, a 20$^{th}$ MOS transistor, a 21$^{st}$ MOS transistor, a 22$^{nd}$ MOS transistor, a 23$^{rd}$ MOS transistor, a 24$^{th}$ MOS transistor, a 25$^{th}$ MOS transistor and a 26$^{th}$ MOS transistor;

wherein the 13$^{th}$ MOS transistor, the 14$^{th}$ MOS transistor, the 15$^{th}$ MOS transistor and the 16$^{th}$ MOS transistor are PMOS transistors; and the 17$^{th}$ MOS transistor, the 18$^{th}$ MOS transistor, the 19$^{th}$ MOS transistor, the 20$^{th}$ MOS transistor, the 21$^{st}$ MOS transistor, the 22$^{nd}$ MOS transistor, the 23$^{rd}$ MOS transistor, the 24$^{th}$ MOS transistor, the 25$^{th}$ MOS transistor and the 26$^{th}$ MOS transistor are NMOS transistors;

wherein a source of the 13$^{th}$ MOS transistor, a source of the 14$^{th}$ MOS transistor, a source of the 15$^{th}$ MOS transistor and a source of the 16$^{th}$ MOS transistor are connected to a grid of the 19$^{th}$ MOS transistor which forms a 22$^{nd}$ connecting terminal, and the 22$^{nd}$ connecting terminal is connected to a power source;

wherein a grid of the 13$^{th}$ MOS transistor and a grid of the 16$^{th}$ MOS transistor are connected to a grid of the 26$^{th}$ MOS transistor which forms a 23$^{rd}$ connecting terminal, and the 23$^{rd}$ connecting terminal is the clock terminal of the 1$^{st}$ three-input NOR/OR gate;

wherein a drain of the 13$^{th}$ MOS transistor, a drain of the 14$^{th}$ MOS transistor, a grid of the 15$^{th}$ MOS transistor and a drain of the 17$^{th}$ MOS transistor are connected to a grid of the 18$^{th}$ MOS transistor which forms a 24$^{th}$ connecting terminal, and the 24$^{th}$ connecting terminal is the NOR logic output terminal of the 1$^{st}$ three-input NOR/OR gate;

wherein a grid of the 14$^{th}$ MOS transistor, a drain of the 15$^{th}$ MOS transistor, a drain of the 16$^{th}$ MOS transistor and a grid of the 17$^{th}$ MOS transistor are connected to a drain of the 18$^{th}$ MOS transistor which forms a 25$^{th}$ connecting terminal, and the 25$^{th}$ connecting terminal is the OR logic output terminal of the 1$^{st}$ three-input NOR/OR gate;

wherein a source of the 17$^{th}$ MOS transistor, a drain of the 19$^{th}$ MOS transistor, a drain of the 20$^{th}$ MOS transistor and a drain of the 21$^{st}$ MOS transistor are connected to a drain of the 22$^{nd}$ MOS transistor;

wherein a source of the 18$^{th}$ MOS transistor and a source of the 19$^{th}$ MOS transistor are connected to a drain of the 23$^{rd}$ MOS transistor;

wherein a source of the 20$^{th}$ MOS transistor and a source of the 23$^{rd}$ MOS transistor are connected to a drain of the 24$^{th}$ MOS transistor;

wherein a source of the 21$^{st}$ MOS transistor and a source of the 24$^{th}$ MOS transistor are connected to a drain of the 25$^{th}$ MOS transistor;

wherein a source of the 22$^{nd}$ MOS transistor and a source of the 25$^{th}$ MOS transistor are connected to a drain of the 26$^{th}$ MOS transistor;

wherein a source of the 26$^{th}$ MOS transistor is grounded;

wherein a grid of the 20$^{th}$ MOS transistor is the 1$^{st}$ input terminal of the 1$^{st}$ three-input NOR/OR gate;

wherein a grid of the 21$^{st}$ MOS transistor is the 2$^{nd}$ input terminal of the 1$^{st}$ three-input NOR/OR gate;

wherein a grid of the 22$^{nd}$ MOS transistor is the 3$^{rd}$ input terminal of the 1$^{st}$ three-input NOR/OR gate;

wherein a grid of the 23$^{rd}$ MOS transistor is the 1$^{st}$ inverting input terminal of the 1$^{st}$ three-input NOR/OR gate;

wherein a grid of the 24$^{th}$ MOS transistor is the 2$^{nd}$ inverting input terminal of the 1$^{st}$ three-input NOR/OR gate;

wherein a grid of the 25$^{th}$ MOS transistor is the 3$^{rd}$ inverting input terminal of the 1$^{st}$ three-input NOR/OR gate;

wherein circuit structure of the 2$^{nd}$ three-input NOR/OR gate, the 3$^{rd}$ three-input NOR/OR gate and the 4$^{th}$ three-input NOR/OR gate is identical to the circuit structure of the 1$^{st}$ three-input NOR/OR gate.

4. The shift register capable of defending against DPA attack according to claim 1, wherein the 1$^{st}$ master-slave D flip-flop comprises a 27$^{th}$ MOS transistor, a 28$^{th}$ MOS transistor, a 29$^{th}$ MOS transistor, a 30$^{th}$ MOS transistor, a 31$^{st}$ MOS transistor, a 32$^{nd}$ MOS transistor, a 33$^{rd}$ MOS transistor, a 34$^{th}$ MOS transistor, a 35$^{th}$ MOS transistor, a 36$^{th}$ MOS transistor, a 37$^{th}$ MOS transistor, a 38$^{th}$ MOS transistor, a 39$^{th}$ MOS transistor, a 40$^{th}$ MOS transistor, a 41$^{st}$ MOS transistor, a 42$^{nd}$ MOS transistor, a 43$^{rd}$ MOS transistor, a 44$^{th}$ MOS transistor, a 45$^{th}$ MOS transistor, a 46$^{th}$ MOS transistor, a 47$^{th}$ MOS transistor, a 48$^{th}$ MOS transistor, a 49$^{th}$ MOS transistor, a 50$^{th}$ MOS transistor, a 51$^{st}$ MOS transistor, a 52$^{nd}$ MOS transistor, a 53$^{rd}$ MOS transistor, a 54$^{th}$ MOS transistor, a 55$^{th}$ MOS transistor and a 56$^{th}$ MOS transistor;

wherein the 27$^{th}$ MOS transistor, the 28$^{th}$ MOS transistor, the 29$^{th}$ MOS transistor, the 30$^{th}$ MOS transistor, the 31$^{st}$ MOS transistor, the 32$^{nd}$ MOS transistor, the 37$^{th}$ MOS transistor, the 38$^{th}$ MOS transistor, the 48$^{th}$ MOS transistor, the 49$^{th}$ MOS transistor, the 50$^{th}$ MOS transistor, the 51$^{st}$ MOS transistor, the 52$^{nd}$ MOS transistor, the 53$^{rd}$ MOS transistor and the 54$^{th}$ MOS transistor are PMOS transistors; and the 33$^{rd}$ MOS transistor, the 34$^{th}$ MOS transistor, the 35$^{th}$ MOS transistor, the 36$^{th}$ MOS transistor, the 39$^{th}$ MOS transistor, the 40$^{th}$ MOS transistor, the 41$^{st}$ MOS transistor, the 42$^{nd}$ MOS transistor, the 43$^{rd}$ MOS transistor, the 44$^{th}$ MOS transistor, the 45$^{th}$ MOS transistor, the 46$^{th}$ MOS transistor, the 47$^{th}$ MOS transistor, the 55$^{th}$ MOS transistor and the 56$^{th}$ MOS transistor are NMOS transistors;

wherein a source of the 27$^{th}$ MOS transistor, a source of the 37$^{th}$ MOS transistor, a grid of the 45$^{th}$ MOS transistor, a source of the 48$^{th}$ MOS transistor, a source of the 49$^{th}$ MOS transistor, a source of the 50$^{th}$ MOS transistor, a source of the 51$^{st}$ MOS transistor and a source of the 52$^{nd}$ MOS transistor are connected to a source of the 53$^{rd}$ MOS transistor which forms a 26$^{th}$ connecting terminal, and the 26$^{th}$ connecting terminal is connected to a power source;

wherein a grid of the 27$^{th}$ MOS transistor, a grid of the 33$^{rd}$ MOS transistor, a grid of the 36$^{th}$ MOS transistor, a grid of the 42$^{nd}$ MOS transistor and a grid of the 48$^{th}$ MOS transistor are connected to a grid of the 51$^{st}$ MOS transistor which forms a 27$^{th}$ connecting terminal, and the 27$^{th}$ connecting terminal is the clock terminal of the 1$^{st}$ master-slave D flip-flop;

wherein a drain of the 27$^{th}$ MOS transistor and a source of the 28$^{th}$ MOS transistor are connected to a source of the 29$^{th}$ MOS transistor;

wherein a grid of the 28$^{th}$ MOS transistor is the input terminal of the 1$^{st}$ master-slave D flip-flop;

wherein a drain of the 28$^{th}$ MOS transistor and a drain of the 30$^{th}$ MOS transistor are connected to a source of the 31$^{st}$ MOS transistor;

wherein a grid of the 29$^{th}$ MOS transistor is the inverting input terminal of the 1$^{st}$ master-slave D flip-flop;

wherein a drain of the 29$^{th}$ MOS transistor and a source of the 30$^{th}$ MOS transistor are connected to a source of the 32$^{nd}$ MOS transistor;

wherein a grid of the 30$^{th}$ MOS transistor is grounded;

wherein a drain of the 31$^{st}$ MOS transistor, a grid of the 32$^{nd}$ MOS transistor, a drain of the 33$^{rd}$ MOS transistor, a drain of the 34$^{th}$ MOS transistor, a grid of the 35$^{th}$ MOS transistor and a grid of the 37$^{th}$ MOS transistor are connected to a grid of the 40$^{th}$ MOS transistor;

wherein a grid of the 31$^{st}$ MOS transistor, a grid of the 34$^{th}$ MOS transistor, a drain of the 32$^{nd}$ MOS transistor, a drain of the 35$^{th}$ MOS transistor, a drain of the 36$^{th}$ MOS transistor and a grid of the 53$^{rd}$ MOS transistor are connected to a grid of the 56$^{th}$ MOS transistor;

wherein a source of the 33$^{rd}$ MOS transistor, a source of the 34$^{th}$ MOS transistor, a source of the 35$^{th}$ MOS transistor and a source of the 36$^{th}$ MOS transistor are grounded;

wherein a drain of the 37$^{th}$ MOS transistor is connected to a source of the 38$^{th}$ MOS transistor;

wherein a grid of the 38$^{th}$ MOS transistor and a grid of the 41$^{st}$ MOS transistor are connected to a grid of the 54$^{th}$ MOS transistor which forms a 28$^{th}$ connecting terminal, and the 28$^{th}$ connecting terminal is the reset terminal of the 1$^{st}$ master-slave D flip-flop;

wherein a drain of the 38$^{th}$ MOS transistor, a drain of the 39$^{th}$ MOS transistor and a drain of the 41$^{st}$ MOS transistor are connected to a grid of the 43$^{rd}$ MOS transistor;

wherein a grid of the 39$^{th}$ MOS transistor and a grid of the 52$^{nd}$ MOS transistor are connected to a grid of the 55$^{th}$ MOS transistor which forms a 29$^{th}$ connecting terminal, and the 29$^{th}$ connecting terminal is the inverting reset terminal of the 1$^{st}$ master-slave D flip-flop;

wherein a source of the 39$^{th}$ MOS transistor is connected to a drain of the 40$^{th}$ MOS transistor;

wherein a source of the 40$^{th}$ MOS transistor and a source of the 41$^{st}$ MOS transistor are grounded;

wherein a source of the 42$^{nd}$ MOS transistor is grounded;

wherein a drain of the 42$^{nd}$ MOS transistor and a source of the 43$^{rd}$ MOS transistor are connected to a source of the 44$^{th}$ MOS transistor;

wherein a drain of the 43$^{rd}$ MOS transistor and a drain of the 45$^{th}$ MOS transistor are connected to a source of the 46$^{th}$ MOS transistor;

wherein a grid of the 44$^{th}$ MOS transistor, a drain of the 52$^{nd}$ MOS transistor and a drain of the 54$^{th}$ MOS transistor are connected to a drain of the 55$^{th}$ MOS transistor;

wherein a drain of the 44$^{th}$ MOS transistor and a source of the 45$^{th}$ MOS transistor are connected to a source of the 47$^{th}$ MOS transistor;

wherein a grid of the 46$^{th}$ MOS transistor, a grid of the 49$^{th}$ MOS transistor, a drain of the 47$^{th}$ MOS transistor and a drain of the 50$^{th}$ MOS transistor are connected to a drain of the 51$^{st}$ MOS transistor which forms a 30$^{th}$ connecting terminal, and the 30$^{th}$ connecting terminal is the output terminal of the 1$^{st}$ master-slave D flip-flop;

wherein a drain of the 46$^{th}$ MOS transistor, a drain of the 48$^{th}$ MOS transistor, a drain of the 49$^{th}$ MOS transistor and a grid of the 47$^{th}$ MOS transistor are connected to a grid of the 50$^{th}$ MOS transistor which forms a 31$^{st}$ connecting terminal, and the 31$^{st}$ connecting terminal is the inverting output terminal of the 1$^{st}$ master-slave D flip-flop;

wherein a drain of the 53$^{rd}$ MOS transistor is connected to a source of the 54$^{th}$ MOS transistor;

wherein a source of the 55$^{th}$ MOS transistor is connected to a drain of the 56$^{th}$ MOS transistor;

wherein a source of the 56$^{th}$ MOS transistor is grounded;

wherein circuit structure of the 2$^{nd}$ master-slave D flip-flop, 3$^{rd}$ master-slave D flip-flop and 4$^{th}$ master-slave D flip-flop is identical to the circuit structure of the 1$^{st}$ master-slave D flip-flop.

* * * * *